(12) United States Patent
Hasarchi et al.

(10) Patent No.: US 11,064,501 B2
(45) Date of Patent: Jul. 13, 2021

(54) HARMONIZING NOISE AGGREGATION AND NOISE MANAGEMENT IN DISTRIBUTED ANTENNA SYSTEM

(71) Applicant: Axell Wireless Ltd., Chesham (GB)

(72) Inventors: Abraham Hasarchi, Petach Tikva (IL); Amir Meir, Petach Tikva (IL)

(*) Notice: Subject to any disclaimer, the term of this patent is extended or adjusted under 35 U.S.C. 154(b) by 63 days.

(21) Appl. No.: 16/527,937

(22) Filed: Jul. 31, 2019

(65) Prior Publication Data

US 2019/0357225 A1 Nov. 21, 2019

Related U.S. Application Data

(63) Continuation of application No. 15/538,248, filed as application No. PCT/US2015/000203 on Dec. 23, 2015, now abandoned.

(60) Provisional application No. 62/096,061, filed on Dec. 23, 2014.

(51) Int. Cl.

| H04W 72/08 | (2009.01) |
| H04B 17/345 | (2015.01) |
| H04B 7/024 | (2017.01) |
| H03G 3/30 | (2006.01) |
| H04W 52/52 | (2009.01) |
| H04B 1/10 | (2006.01) |
| H04W 12/037 | (2021.01) |
| H04W 28/04 | (2009.01) |
| H04W 16/10 | (2009.01) |
| H04W 88/08 | (2009.01) |

(52) U.S. Cl.
CPC ........ *H04W 72/082* (2013.01); *H03G 3/3047* (2013.01); *H03G 3/3089* (2013.01); *H04B 1/1027* (2013.01); *H04B 7/024* (2013.01); *H04B 17/345* (2015.01); *H04W 12/037* (2021.01); *H04W 28/04* (2013.01); *H04W 52/52* (2013.01); *H04W 16/10* (2013.01); *H04W 88/085* (2013.01)

(58) Field of Classification Search
CPC ... H04W 72/082; H04W 28/04; H04B 17/345
See application file for complete search history.

(56) References Cited

U.S. PATENT DOCUMENTS

| 5,621,786 A | 4/1997 | Fischer et al. |
| 5,627,879 A | 5/1997 | Russell et al. |
| 5,642,405 A | 6/1997 | Fischer et al. |

(Continued)

FOREIGN PATENT DOCUMENTS

| EP | 2092363 B1 | 3/2013 |
| EP | 2327272 B1 | 6/2013 |

(Continued)

OTHER PUBLICATIONS

Official Action dated Oct. 18, 2018, from Canada Application No. 2,971,853, 4 sheets.

(Continued)

*Primary Examiner* — Jamal Javaid
(74) *Attorney, Agent, or Firm* — Wood Herron & Evans LLP

(57) ABSTRACT

The present invention is directed to systems and methods for reducing noise levels by harmonization in a DCC-DAS using smart weighted aggregation of noise and signal resources to achieve an optimal signal to noise ratio in varying traffic and interference conditions.

20 Claims, 13 Drawing Sheets

(56) References Cited

U.S. PATENT DOCUMENTS

| | | |
|---|---|---|
| 5,644,622 A | 7/1997 | Russell et al. |
| 5,657,374 A | 8/1997 | Russell et al. |
| 5,809,422 A | 9/1998 | Raleigh et al. |
| 5,852,651 A | 12/1998 | Fischer et al. |
| 5,880,863 A | 3/1999 | Rideout et al. |
| 5,922,051 A | 7/1999 | Sidey |
| 6,112,086 A | 8/2000 | Wala |
| 6,151,480 A | 11/2000 | Fischer et al. |
| 6,205,133 B1 | 3/2001 | Bexten |
| 6,308,085 B1 | 10/2001 | Shoki |
| 6,417,669 B1 | 7/2002 | Champlin |
| 6,657,993 B1 | 12/2003 | Casanova et al. |
| 6,801,767 B1 | 10/2004 | Schwartz et al. |
| 6,804,540 B1 | 10/2004 | Shepherd et al. |
| 6,836,660 B1 | 12/2004 | Wala |
| 7,010,315 B1 | 3/2006 | Pan et al. |
| 7,103,377 B2 | 9/2006 | Bauman et al. |
| 7,171,244 B2 | 1/2007 | Bauman |
| 7,173,183 B2 | 2/2007 | McMahon et al. |
| 7,194,275 B2 | 3/2007 | Bolin et al. |
| 7,245,603 B1 | 7/2007 | Lucidarme et al. |
| 7,286,507 B1 | 10/2007 | Oh et al. |
| 7,398,106 B2 | 7/2008 | Conyers et al. |
| RE40,564 E | 11/2008 | Fischer et al. |
| 7,483,504 B2 | 1/2009 | Shapira et al. |
| 7,539,509 B2 | 5/2009 | Bauman et al. |
| 7,546,138 B2 | 6/2009 | Bauman |
| 7,554,946 B2 | 6/2009 | Conyers et al. |
| 7,574,234 B2 | 8/2009 | Conyers et al. |
| 7,577,439 B2 | 8/2009 | Halonen |
| 7,599,711 B2 | 10/2009 | Hermel et al. |
| 7,668,153 B2 | 2/2010 | Zavadsky |
| 7,688,135 B2 | 3/2010 | Kim et al. |
| 7,761,093 B2 | 7/2010 | Sabat, Jr. et al. |
| 7,805,073 B2 | 9/2010 | Sabat, Jr. et al. |
| 7,822,148 B2 | 10/2010 | Shapira et al. |
| 7,917,177 B2 | 3/2011 | Bauman |
| 7,933,572 B1 | 4/2011 | Johnson |
| 7,961,618 B1 | 6/2011 | Prasad et al. |
| 7,961,689 B2 | 6/2011 | Stratford |
| 8,005,050 B2 | 8/2011 | Scheinert et al. |
| 8,005,152 B2 | 8/2011 | Wegener |
| 8,009,613 B1 | 8/2011 | Gunasekara et al. |
| 8,050,246 B2 | 11/2011 | Wala et al. |
| 8,064,850 B2 | 11/2011 | Yang et al. |
| 8,107,464 B2 | 1/2012 | Schmidt et al. |
| 8,135,102 B2 | 3/2012 | Wiwel et al. |
| 8,135,273 B2 | 3/2012 | Sabat, Jr. et al. |
| 8,149,950 B2 | 4/2012 | Kim et al. |
| 8,165,169 B2 | 4/2012 | Hedin et al. |
| 8,174,428 B2 | 5/2012 | Wegener |
| 8,194,597 B2 | 6/2012 | Feder et al. |
| 8,224,266 B2 | 7/2012 | Liu et al. |
| 8,274,332 B2 | 9/2012 | Cho et al. |
| 8,306,563 B2 | 11/2012 | Zavadsky et al. |
| 8,326,238 B2 | 12/2012 | Yang et al. |
| 8,326,324 B2 | 12/2012 | Wu et al. |
| 8,340,605 B2 | 12/2012 | Hou et al. |
| 8,351,877 B2 | 1/2013 | Kim et al. |
| 8,380,143 B2 | 2/2013 | Yang et al. |
| 8,396,368 B2 | 3/2013 | Tarlazzi et al. |
| 8,400,292 B2 | 3/2013 | Kummetz |
| 8,401,499 B2 | 3/2013 | Kim et al. |
| 8,412,206 B2 | 4/2013 | Kwon et al. |
| 8,452,305 B2 | 5/2013 | Brisebois et al. |
| 8,467,747 B2 | 6/2013 | Kim et al. |
| 8,472,409 B2 | 6/2013 | Sun et al. |
| 8,472,897 B1 | 6/2013 | Yang |
| 8,472,963 B2 | 6/2013 | Caire |
| 8,483,702 B2 | 7/2013 | Noriega et al. |
| 8,509,347 B2 | 8/2013 | Kim et al. |
| 8,526,388 B1 | 9/2013 | Kaukovuori et al. |
| 8,542,768 B2 | 9/2013 | Kim et al. |
| 8,548,403 B2 | 10/2013 | Kim et al. |
| 9,179,321 B2 | 11/2015 | Hasarchi et al. |
| 2002/0075906 A1 | 6/2002 | Cole et al. |
| 2002/0093926 A1 | 7/2002 | Kilfoyle |
| 2003/0181221 A1 | 9/2003 | Nguyen |
| 2003/0236067 A1 | 12/2003 | Hasarchi et al. |
| 2004/0106435 A1 | 6/2004 | Bauman et al. |
| 2005/0041968 A1 | 2/2005 | Takahashi |
| 2005/0152695 A1 | 7/2005 | Sulzberger et al. |
| 2006/0094470 A1 | 5/2006 | Wake et al. |
| 2006/0209752 A1 | 9/2006 | Wijngaarden et al. |
| 2007/0087756 A1 | 4/2007 | Hoffberg |
| 2007/0135042 A1 | 6/2007 | Sniff et al. |
| 2007/0243899 A1 | 10/2007 | Hermel et al. |
| 2007/0253714 A1 | 11/2007 | Seeds et al. |
| 2007/0274279 A1 | 11/2007 | Wood et al. |
| 2008/0009244 A1 | 1/2008 | Lee |
| 2008/0051129 A1 | 2/2008 | Abe et al. |
| 2008/0058018 A1 | 3/2008 | Scheinert |
| 2008/0124087 A1 | 5/2008 | Hartmann et al. |
| 2008/0181282 A1 | 7/2008 | Wala et al. |
| 2008/0194226 A1 | 8/2008 | Rivas et al. |
| 2008/0219392 A1* | 9/2008 | Riani ............... G11B 20/1403 375/371 |
| 2008/0225816 A1 | 9/2008 | Osterling et al. |
| 2008/0232328 A1 | 9/2008 | Scheinert et al. |
| 2008/0319392 A1 | 9/2008 | Riani et al. |
| 2008/0265996 A1 | 10/2008 | Kim et al. |
| 2009/0005096 A1 | 1/2009 | Scheinert |
| 2009/0029664 A1 | 1/2009 | Batruni |
| 2009/0061939 A1 | 3/2009 | Andersson et al. |
| 2009/0061940 A1 | 3/2009 | Scheinert et al. |
| 2009/0085658 A1 | 4/2009 | Liu et al. |
| 2009/0180423 A1 | 7/2009 | Kroener |
| 2009/0180426 A1 | 7/2009 | Sabat et al. |
| 2009/0285194 A1 | 11/2009 | Kim et al. |
| 2009/0316766 A1* | 12/2009 | Korobkov ............ H04L 5/0046 375/227 |
| 2010/0002626 A1 | 1/2010 | Schmidt et al. |
| 2010/0002661 A1 | 1/2010 | Schmidt et al. |
| 2010/0008669 A1 | 1/2010 | Rhy et al. |
| 2010/0014494 A1 | 1/2010 | Schmidt et al. |
| 2010/0177759 A1 | 7/2010 | Fischer et al. |
| 2010/0177760 A1 | 7/2010 | Cannon et al. |
| 2010/0178936 A1 | 7/2010 | Wala |
| 2010/0202356 A1 | 8/2010 | Fischer et al. |
| 2010/0208777 A1 | 8/2010 | Ogaz |
| 2010/0271957 A1 | 10/2010 | Stapleton et al. |
| 2010/0296458 A1 | 11/2010 | Wala et al. |
| 2010/0296816 A1 | 11/2010 | Larsen |
| 2011/0028157 A1 | 2/2011 | Larsen |
| 2011/0039497 A1 | 2/2011 | Hammarwall et al. |
| 2011/0122772 A1 | 5/2011 | Stuart |
| 2011/0122788 A1 | 5/2011 | Sombrutzki |
| 2011/0135308 A1 | 6/2011 | Tarlazzi et al. |
| 2011/0141895 A1 | 6/2011 | Zhang |
| 2011/0156815 A1 | 6/2011 | Kim et al. |
| 2011/0158081 A1 | 6/2011 | Wang et al. |
| 2011/0177827 A1 | 7/2011 | Crilly, Jr. et al. |
| 2011/0201269 A1 | 8/2011 | Hobbs et al. |
| 2011/0201368 A1 | 8/2011 | Faccin et al. |
| 2011/0244785 A1 | 10/2011 | Scheinert |
| 2011/0268449 A1 | 11/2011 | Berlin et al. |
| 2011/0312359 A1 | 12/2011 | Kolding et al. |
| 2012/0039254 A1 | 2/2012 | Stapleton et al. |
| 2012/0039320 A1 | 2/2012 | Lemson et al. |
| 2012/0039321 A1 | 2/2012 | Ghosh et al. |
| 2012/0046038 A1 | 2/2012 | Gao et al. |
| 2012/0057572 A1 | 3/2012 | Evans et al. |
| 2012/0069880 A1 | 3/2012 | Lemson et al. |
| 2012/0076027 A1 | 3/2012 | Akyildiz et al. |
| 2012/0106404 A1 | 5/2012 | Damnjanovic |
| 2012/0106657 A1 | 5/2012 | Fischer et al. |
| 2012/0134279 A1 | 5/2012 | Tamaki |
| 2012/0134666 A1 | 5/2012 | Casterline et al. |
| 2012/0135695 A1 | 5/2012 | Yang et al. |
| 2012/0178483 A1 | 7/2012 | Rosenau |
| 2012/0189074 A1 | 7/2012 | Jin et al. |
| 2012/0207145 A1 | 8/2012 | Han et al. |
| 2012/0257516 A1 | 10/2012 | Pazhyannur et al. |
| 2012/0275530 A1 | 11/2012 | Nazar et al. |

(56) References Cited

U.S. PATENT DOCUMENTS

| | | |
|---|---|---|
| 2012/0281565 A1 | 11/2012 | Sauer |
| 2012/0314797 A1 | 12/2012 | Kummetz et al. |
| 2012/0321314 A1 | 12/2012 | Oren et al. |
| 2012/0322501 A1 | 12/2012 | Abouzid et al. |
| 2013/0005375 A1 | 1/2013 | Chen |
| 2013/0009707 A1 | 1/2013 | Kim et al. |
| 2013/0017863 A1 | 1/2013 | Kummetz et al. |
| 2013/0028218 A1 | 1/2013 | Chun et al. |
| 2013/0040676 A1 | 2/2013 | Kang et al. |
| 2013/0045755 A1 | 2/2013 | Davis |
| 2013/0050054 A1 | 2/2013 | Chan et al. |
| 2013/0077713 A1 | 3/2013 | Kim et al. |
| 2013/0079035 A1 | 3/2013 | Wala et al. |
| 2013/0084886 A1 | 4/2013 | Crilly et al. |
| 2013/0095870 A1 | 4/2013 | Phillips et al. |
| 2013/0095871 A1 | 4/2013 | Soriaga et al. |
| 2013/0114486 A1 | 5/2013 | Spedaliere et al. |
| 2013/0114963 A1 | 5/2013 | Stapleton et al. |
| 2013/0121703 A1 | 5/2013 | Kummetz et al. |
| 2013/0122946 A1 | 5/2013 | Zhu |
| 2013/0128760 A1 | 5/2013 | Fujishima et al. |
| 2013/0128810 A1 | 5/2013 | Lee et al. |
| 2013/0143598 A1 | 6/2013 | Srinivasan et al. |
| 2013/0147550 A1 | 6/2013 | Yang et al. |
| 2013/0150065 A1 | 6/2013 | Elliott et al. |
| 2013/0201916 A1 | 8/2013 | Kummetz et al. |
| 2013/0236180 A1 | 9/2013 | Kim et al. |
| 2013/0243124 A1 | 9/2013 | Yang et al. |
| 2013/0251066 A1 | 9/2013 | Kim et al. |
| 2013/0272202 A1 | 10/2013 | Stapleton et al. |
| 2013/0272696 A1 | 10/2013 | Palanisamy et al. |
| 2013/0295980 A1 | 11/2013 | Reuven et al. |
| 2013/0315291 A1 | 11/2013 | Kim et al. |
| 2013/0329825 A1 | 12/2013 | Oren et al. |
| 2013/0331136 A1 | 12/2013 | Yang et al. |
| 2013/0336370 A1 | 12/2013 | Jovanovic et al. |
| 2013/0337750 A1* | 12/2013 | Ko ..................... H04W 24/00 455/67.13 |
| 2014/0024402 A1 | 1/2014 | Singh |
| 2014/0031047 A1 | 1/2014 | Jovanovic et al. |
| 2014/0057627 A1 | 2/2014 | Hejazi et al. |
| 2014/0072299 A1 | 3/2014 | Stapleton et al. |
| 2014/0078939 A1 | 3/2014 | Shirani-Mehr et al. |
| 2014/0161057 A1 | 6/2014 | Hejazi et al. |
| 2014/0162644 A1 | 6/2014 | Ou |
| 2014/0162664 A1 | 6/2014 | Stapleton et al. |
| 2014/0169794 A1 | 6/2014 | Notargiacomo |
| 2014/0233548 A1 | 8/2014 | Leizerovich et al. |
| 2014/0241258 A1 | 8/2014 | Zack et al. |
| 2014/0269318 A1 | 9/2014 | Hasarchi et al. |
| 2016/0007205 A1 | 1/2016 | Hasarchi et al. |

FOREIGN PATENT DOCUMENTS

| | | |
|---|---|---|
| EP | 2789107 A1 | 10/2014 |
| EP | 2789107 A1 | 10/2014 |
| EP | 2789107 | 2/2017 |
| EP | 3238352 A1 | 11/2017 |
| KR | 2011085828 A | 7/2011 |
| KR | 1541262 | 7/2015 |
| WO | WO2011100219 A1 | 8/2011 |
| WO | WO2011123336 A1 | 10/2011 |
| WO | WO2012024349 A1 | 2/2012 |
| WO | WO2012033659 A1 | 3/2012 |
| WO | WO2012159303 A1 | 11/2012 |
| WO | WO2013028197 A1 | 2/2013 |
| WO | WO2013003717 A3 | 3/2013 |
| WO | WO2013029145 A1 | 3/2013 |
| WO | WO2013033199 A1 | 3/2013 |
| WO | 2014-026005 | 2/2014 |
| WO | 2014/026005 A1 | 2/2014 |
| WO | 2014/026005 A1 | 2/2014 |
| WO | 2014026005 A1 | 2/2014 |
| WO | 2014-040608 | 3/2014 |
| WO | 2014/040608 A1 | 3/2014 |
| WO | 2014040608 A1 | 3/2014 |
| WO | 2014040608 A1 | 3/2014 |
| WO | 2016/049002 | 3/2016 |
| WO | 2016/105478 | 6/2016 |
| WO | 2016105478 A1 | 6/2016 |

OTHER PUBLICATIONS

Canadian Office Action dated Sep. 9, 2020, from Canadian Patent Application No. 3,017,856, 4 sheets.
Office Action dated Jan. 17, 2019, from U.S. Appl. No. 15/538,248, 71 sheets.
Canadian Requisition by the Examiner in Accordance with Subsection 30(2) dated Jun. 27, 2019, from Canada Application No. 2,971,853, 6 sheets.
Office Action dated Sep. 29, 2017, from the corresponding Canada Application No. 2,961,696.
Examination report No. 1 for standard patent application dated Feb. 11, 2020, from Australian Patent Application No. 2019200093, 5 sheets.
Examination report No. 1 for standard patent application dated Jan. 8, 2018, from the corresponding Australian Application No. 2015371287.
The extended European search report dated Jul. 23, 2018, from the related EP Application No. 15873767.6, 10 sheets.
Official Action dated Nov. 14, 2018, from U.S. Appl. No. 15/510,738, 69 sheets.
Official Action dated Aug. 17, 2018, from Canada Application No. 2,961,696, 4 sheets.
International Preliminary Report on Patentability and Written Opinion of the International Searching Authority dated Feb. 10, 2015 from corresponding Application No. PCT/US2013/054143.
U.S. Office Action dated Dec. 15, 2014 from corresponding U.S. Appl. No. 14/360,026.
International Search Report dated Nov. 20, 2013, from the corresponding PCT/US2013/054143.
"CDMA Co-Pilot Beacon Transmitter", Cellular Specialties, Inc.: Co-Pilot Beacon Jun. 6, 2012.
Gary Williamson, "Increasing In-Building Capacity with WiFi Offload", NEXIUS, Apr. 25, 2012, pp. 1 to 3.
"Overcoming Barriers to Communication 3000 Distributed Antenna System", Pacific Wave Wireless Zinwave, In-Building Cellular and Wireless Technology, www.pactificwave-wireless.com, Jan. 23, 2012.
Hartmann, P., et. al., "Wideband fibre-agnostic DAS using pluggable analogue optical modules", IEEE Xplore Digital Library, Microwave Photonics, 2006. MWP '06. International Topical Meeting on, Oct. 2006, p. 1 of 1.
"Fiber Distributed Antenna Systems for Indoor and Outdoor-IONTM-Series", COMMSCOPE, Jan. 23, 2012.
"T-Series tHostR Quad-Band Headend Unit" Dali Wireless Inc., 2013.
"t-Series t30TM Quad-Band Low Power Remote Unit", Dali Wireless Inc., 2013.
"t-Series t43TM Dual-Band High Power Remote Unit", Dali Wireless Inc., 2013.
"NMS Network Management System", Dali Wireless Inc., 2013.
"CMS Capacity Management System", Dali Wireless Inc., 2013.
"Industry Applications Intelligent Solutions for Every Environment", Dali Wireless Inc., 2013, pp. 1-8.
"System Overview" Dali Wireless Inc., 2013, pp. 1-11.
The Dali Difference All Digital Smart RF RouterTM More Data Throughput with Less Equipment and Best Tool Cost of Ownership, Dali Wireless Inc., 2013, pp. 1-8.
"You're Heard, Loud and Clear. Installation and Operation Manual for the SBIII Digital Signal Booster Model 613-8", Bird Technologies Group, Manual Part No. 7-9485, Signal Booster III Digital Technology, pp. 1-28, Sep. 12 2011.
Supplementary European Search Report dated Oct. 7, 2015, from the corresponding EP Application No. 13827591.2-1857.
Non-final Rejection dated Dec. 15, 2014, from the Corresponding U.S. Appl. No. 14/360,026.
Notice of Allowance dated Jul. 27, 2015, from the corresponding U.S. Appl. No. 14/360,026.

(56) References Cited

OTHER PUBLICATIONS

International Search Report and Written Opinion dated Feb. 23, 2016, from the responding PCT/US2015/051412.
Intenational Preliminary Report on Patentability dated Mar. 28, 2017, from the corresponding PCT/US2015/051412.
International Search Report and Written Opinion dated Apr. 19, 2016, from the corresponding PCT/US2015/000203.
Final Rejection dated Jan. 9, 2017, from the corresponding U.S. Appl. No. 14/853,123.
Non-Final Rejection dated Jun. 16, 2016, from the corresponding U.S. Appl. No. 14/853,123.
Office Action dated Oct. 28, 2014, from the corresponding KR 10-2014-7012918.
The extended European search report dated Apr. 20, 2018, from the corresponding EP Application No. 15845418, 7 sheets.
U.S. Office Action dated Sep. 11, 2019, from U.S. Appl. No. 16/117,920.
Non-Final Rejection dated Jan. 17, 2019, from U.S. Appl. No. 15/538,248, 76 sheets.
Canadian Office Action dated Sep. 23, 2020, from Canadian Patent Application No. 2,971,853, 5 sheets.
First Examination Report (FER) dated Feb. 28, 2020, from Indian Patent Application No. 201717009088, 6 sheets.

* cited by examiner

HARMONIZING NOISE AGGREGATION AND NOISE MANAGEMENT IN DISTRIBUTED ANTENNA SYSTEM

FIELD OF THE INVENTION

The purpose of this application is to describe an algorithm and method that may leverage the unique features and capabilities of a DCCDAS (Digital Capacity Centric DAS) invented and described in International Application No. PCT/US2013/054143, filed Aug. 8, 2013, which is incorporated by reference in its entirety, in order to perform harmonizing noise aggregation and management in distributed antenna system.

By harmonizing we mean a running process of smart weighted aggregation of noise and signal resources which aims to achieve an optimal signal to noise ratio in varying traffic and interference conditions.

BACKGROUND OF THE INVENTION

Noise and in particular noise after it has been aggregated from the various DAS zones is the major factor limiting the DAS data traffic capabilities. As cellular networks evolve, the requirements for the DAS receivers dynamic range and signal to noise ratio is becoming more demanding from the networks that are feeding them. DAS networks have traditionally aggregated noise simply by its summation function, and noise was treated as a given limiting problem and best practices operation have been adapted to accommodate this limiting factor.

In order to better understand noise and noise behavior in DAS network, one must first acknowledge and understand its sources:

Thermal noise is the first contributing element to the aggregated noise of a DAS network, as it appears in all the distributed antennas of the network and then amplified and summated from all of the antennas selected to distribute the same cellular sector.

Pre-amplification attenuation, although compensated by the cellular networks power control function, will cause mobiles served under the subjected antenna to increase their emitted power, resulting inevitably in excessive interference in the DAS network. Unfortunately, this noise rise affects not only the subject antenna, but also causes a noise rise in any antennas in the transmission range of the mobile.

The pre-amplification mobile uplink signal attenuation is a major limiting factor in passive DAS networks, since all the distribution is done passively (RF power combiner, dividers, coupler and coaxial cable) and all the passive elements are contributing to the pre-amplification attenuation. In active DAS (unlike passive DAS), the pre-amplification attenuation is confined to the passive elements between the antenna and the remote radio unit. In some implementations of DAS networks, the antenna is part of the remote unit and therefore these elements are negligible. In others, there is a short low loss coaxial cable connecting the antenna to the remote radio head.

Noise Fig, in any active DAS network, each receiving chain has its own noise Fig, this actively generated noise is mostly affected by the DAS RRU front end passive elements and low noise amplifier (LNA). Additional elements in the DAS RRU receiver may have a dramatic contribution to the receiver noise Fig, an example for such element in an IF (down and up convert) active DAS networks are the converting local oscillator noise.

Laser noise is a major excessive noise contributor to DAS networks utilizing analog fiber optic transportation, the limiting factors affecting the laser noise contribution is its dynamic range and its stability.

Passive and active nonlinearity, this is a common cause for noise rise typically occur in a multi host DAS networks. A DAS network occupied with multiple cellular networks, multiple frequency bands and multiple technologies is most likely to be affected from this phenomenon. The cause for the noise rise due to nonlinearity can be internal to the DAS network, for examples from the final power amplifier if there is insufficient isolation between the down-link end up-link frequencies. Examples for additional passive nonlinearity are the use of insulation PIM rated antenna or failure in a coaxial connector.

In addition to the above noise contributing sources there are two major noise sources which are becoming the biggest obstacle in the quest of reaching the optimal high capacity DAS network. These two are the most challenging since they cannot be pre-planned or anticipate;

Noise rising failure is the biggest noise contributing source due to the scale of active DAS networks and the rising number of active elements. Unfortunately, it is inevitable to avoid a statistical failure over time. In most cases a confined failure is manageable but the fact that DAS networks are eventually an aggregation network a single point of failure may affect an entire cluster or in server cases that entire DAS network.

External radiation noise—External sources are becoming the significant limiting factor. These noise sources are the most challenging since the origins are not part of the DAS network, and their behavior and characteristic cannot be anticipated or controlled. The external radiation noise sources may be wideband or narrowband, constant or sporadic that may affect the entire DAS network spectrum or a specific band or channel. The external radiation noise sources may be a local phenomenon affecting only one antenna, or a spread phenomenon affecting a whole cluster of antennas. There are infinite sources for external radiation noise; common examples are industrial equipment such as generators and heavy equipment's, unauthorized communication equipment, cell jammers, oscillating BDA, light fixtures, LED stadium screens and many more ongoing threats.

SUMMARY

The present invention is directed to systems and methods for reducing noise levels by harmonization in a DCC-DAS using smart weighted aggregation of noise and signal resources to achieve an optimal signal to noise ratio in varying traffic and interference conditions.

DESCRIPTION

Figure 1:
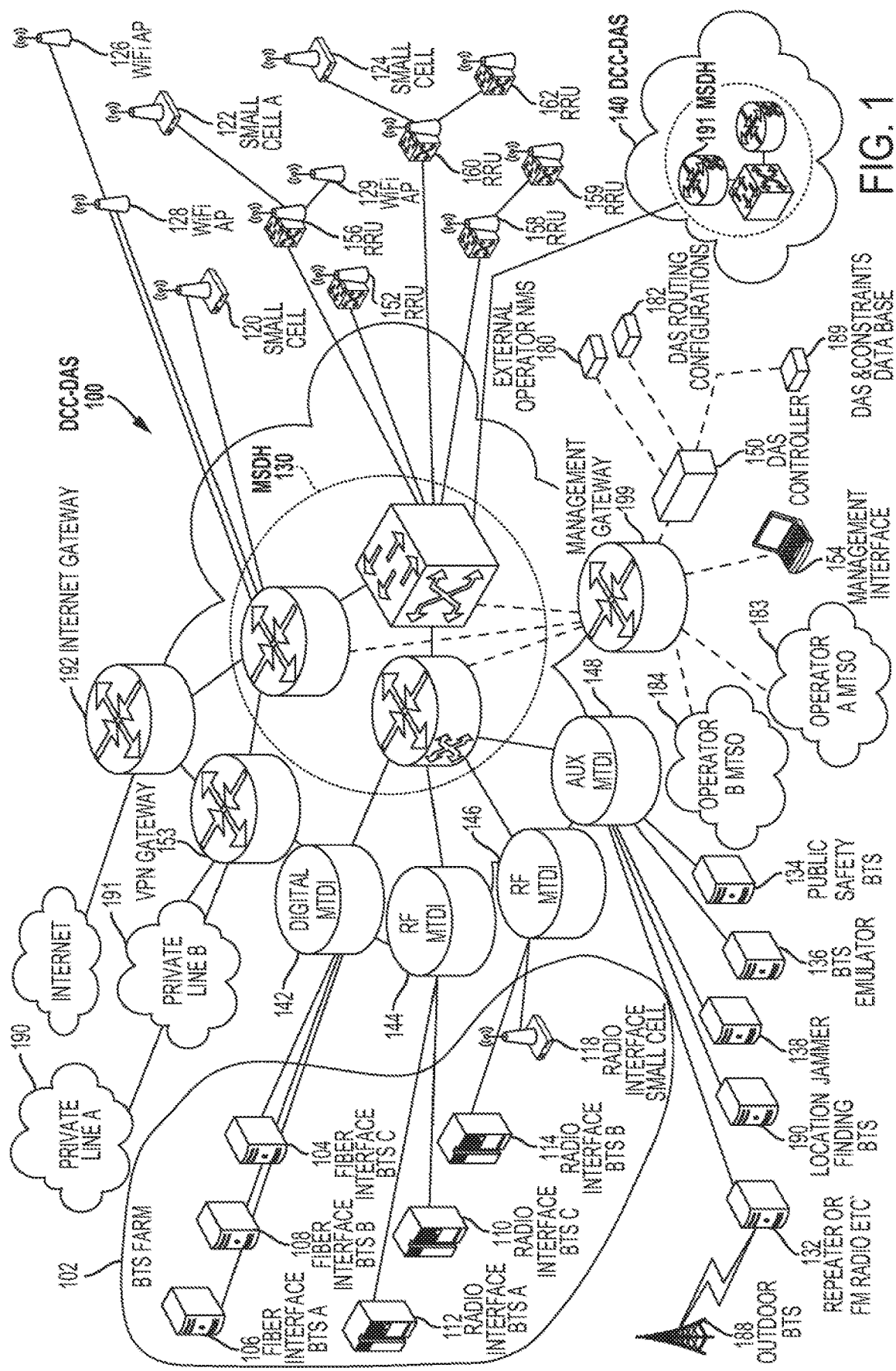
FIG. 1 depicts a function block diagram of a DCC-DAS according to an exemplary embodiment of an optional platform for the invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

An exemplary DCCDAS Architecture (PCT/US2013/054143) is provided as platform in which the harmonizing noise aggregation and noise management algorithms may be implemented. One skilled in the art should recognize that the invented algorithms may also be implemented in other DAS architectures.

FIG. 1 depicts a function block diagram of DCC-DAS 100 according to an exemplary embodiment of an optional platform for the invention. DCC-DAS 100 integrates multiple resources of capacity, such as Cellular 2G/3G/4G resources, public safety resources, small cell, and broadband resources into one integrated operational system that is able to centrally manage its capacity resources and distribute them accordingly.

BTS farm 102 is the main resource of capacity of DCC-DAS 100. BTS farm 102 comprises various BTS's covering multiple technologies. Digital Fiber interface BTS's 104, 106, and 108 have digital baseband fiber interface (For example CPRI data) outputs whereas Radio Interface BTS's 110, 112, 114 and radio interface small cell 118 have Radio RF outputs.

Other capacity resources, like small cells 118, 120, 122, and 124 or Wi-Fi access points 126, 128 and 129 can be used by DCC-DAS 100 for offloading capacity purposes. They can be installed either in BTS farm 102, like small cell 118, or in remote zones, like small cells 120, 122, and 124 and WIFI access points 126, 128, and 129. MSDH 130 manages all the capacity resources of DCC-DAS 100. DCC-DAS 100 can be leveraged to manage auxiliary resources like off-air repeaters (Off air repeater receives the signal from remote BTS 188) or FM Radios 132, public safety BTS 134, and BTS emulator 136 for location finding purposes.

DCC-DAS 100 can be used to direct the signal from jammer 138 to specific zones in which cellular calls are prohibited. As depicted in FIG. 1, DCC-DAS 100 is modular and can be connected to slave MSDH 191 and/or slave DCC-DAS 140 which covers other zones not serviced by DCC-DAS 100.

Each BTS in BTS farm 102 is connected to an MTDI. As shown, Digital fiber interfaced BTS's 104, 106, and 108 are connected to digital MTDI 142; RF BTS's 110 and 112 are connected to RF MTDI 144; and RF BTS 114 and Small Cell 118 are connected to RF MTDI 146. RF MTDIs 144 and 146 may passively combine the incoming RF signals from the various RF BTS's (110, 112, 114, and, 118) and adjust the level of the RF signals to the working level required by MTDI digital processor (320 in FIG. 3) which is part of each MTDI. Each MTDI can handle multiple BTS's. However if the number of BTS's in BTS farm 102 is greater than the maximum that can be handled by a single MTDI, then a number of additional MTDI's may be deployed as depicted in FIG. 1. Each BTS may also have MIMO links. The MIMO link connections and the way DCC-DAS 100 deals with MIMO links is shown separately in FIG. 13.

FIG. 1 depicts multiple RRUs 152, 156, 160, 162 which are connected to MSDH 130. Each RRU with its own antenna system covers a specific zone.

DCC-DAS 100 serves as IP backhaul for various devices such as Wi-Fi Access Points 128 and 129 or small cells 120 and 122. They can be directly connected to MSDH 130 like Wi-Fi access point (AP) 126 and Small cell 120 or through the RRUs like small cell 122 and Wi-Fi AP 129.

The IP backhaul data aforementioned is routed to MSDH 130 who splits the IP backhaul data from the digitized cellular data and sends the IP data to the Internet gateway 192 or VPN gateway 153 from which it is routed to the internet or to private lines 190 and 191, thus connecting those Wi-Fi APs or small cells with the external world or the operators network.

DAS controller 150 manages and controls the DCC-DAS 100. DAS controller 140 stores the various configurations of the DAS and various parameters such as routing configurations 182 (which is part of DAS controller 150) and Infrastructure constraints database 189 which is also part of DAS controller 150. DAS controller 150 interfaces with MSDH 130 through management gateway 199. The human machine interface 154 which enables the DAS operator to control and manage the system is also interfaced with the MSDH 130 through management gateway 199. DAS controller 150 is able to connect to an external operator NMS (Network Management System), send alarm data, or accept control data from the NMS. This NMS can be a conventional NMS or part of a Cloud computing network that supports multiple BTS's. The management gateway 199 can directly interface with the operators' mobile telephone switching office (MTSO) 183, 184 for various control and management functions which will be explained later or it can interface with the operator cloud computing network.

Figure 2A:
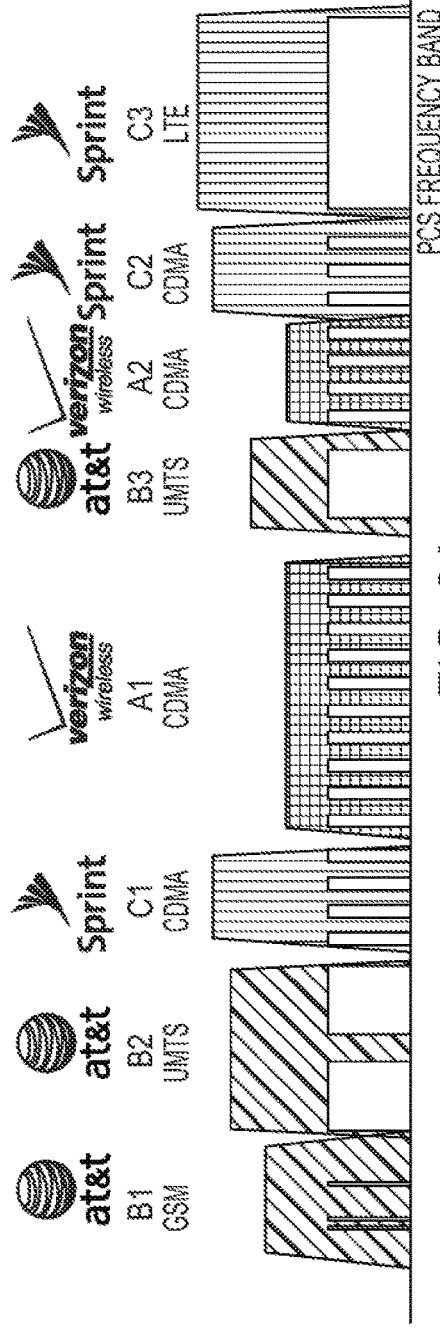
FIG. 2A shows as an example the cell resources in the US PCS frequency band.

In the downlink direction, each MTDI converts each incoming RF signal to an IF signal and then digitizes the IF signals and passes them through a digital filter bank. The MTDI may filter each incoming signal using a specific digital filter matched to the technology and the bandwidth of each BTS cell resource as shown in FIG. 2A. A cell resource is defined as a contiguous piece of spectrum that the operator of the DCC-DAS wishes to distribute, for example, consisting of one or more wireless signals of the same wireless cellular technology type. However, this is just an example. A cell resource can also be any contiguous piece of spectrum in the frequency bands of the DCC-DAS that the operator wishes to digitize and distribute via the DCC-DAS RRUs. FIG. 2A shows as an example the cell resources in the US PCS frequency band A1 and A2 are Verizon™ cell resources in the PCS band; B1, B2, and B3 are AT&T™ cell resources in the PCS band; and C1, C2, and C3 are Sprint™ cell resources in the PCS band. The MTDI then converts the digital filtered signals to a digital stream of data samples (e.g. I/Q data samples) which are routed to MSDH 130.

In the uplink direction, MTDI 142 performs the reverse operation. MTDI 142 receives the stream of digitized RF data packets coming from the various RRUs through MSDH 130 and distributes them throughout BTS farm 142, 144, 146 and 148. The RRU's have their own digital filter bank accordingly.

Returning to the Downlink Each MTDI band module may serve one sector and the output of the MTDI will be routed by MSDH 130 to one or more RRUs each hone serving his own zone. If additional zones need to be covered, or more capacity is required in one or more zones, then a new sector may be used to cover the additional zones in the building, or to provide more capacity to existing zones by dividing the area covered by DCC-DAS into new zones, each one covered by a dedicated sector. In this case, a second MTDI (MTDI 146 in FIG. 1) may be connected to an additional BTS 114 and small cell 118 for example. The output of the second MTDI 146 will be connected to MSDH 130. This second MTDI output will be another cell resource vector consisting of all the cell resources in the second sector. DCC-DAS 100 can now support up to n different sectors. Each sector will be routed to one or more zones in the area covered by DCC-DAS 100.

The communication between the DCC-DAS elements can be based on any suitable digital protocol, such as CPRI/OBSAI serial protocols or any other serial data protocol. MSDH 130 also embeds an Ethernet layer with the serial data stream of digitized cell resource data samples in order to transmit control data and serve as the IP backhaul of the offload devices such as small cells, Wi-Fi access points, or any other offload device. The various offload devices may be connected to the RRUs (e.g., Wi-Fi AP 129 is connected to RRU 156 by Ethernet connection in FIG. 1) and from there through the RRU CPRI link to the MSDH 130 or directly to the Ethernet switch 612 associated with the MSDH (e.g., Wi-Fi AP 128 in FIG. 1).

MSDH 130 may connect to slave MSDH 191 (FIG. 1)—through one of the suitable digital protocols, thus enabling a modular growth of the system. Several slave MSDH's which control additional multiple RRUs can be cascaded using this methodology, enabling the system to cover huge campuses and residential areas. Thus, this architecture enables modular growth by cascading MSDH elements, each one of them serving multiple remote RRUs.

Figure 2B:
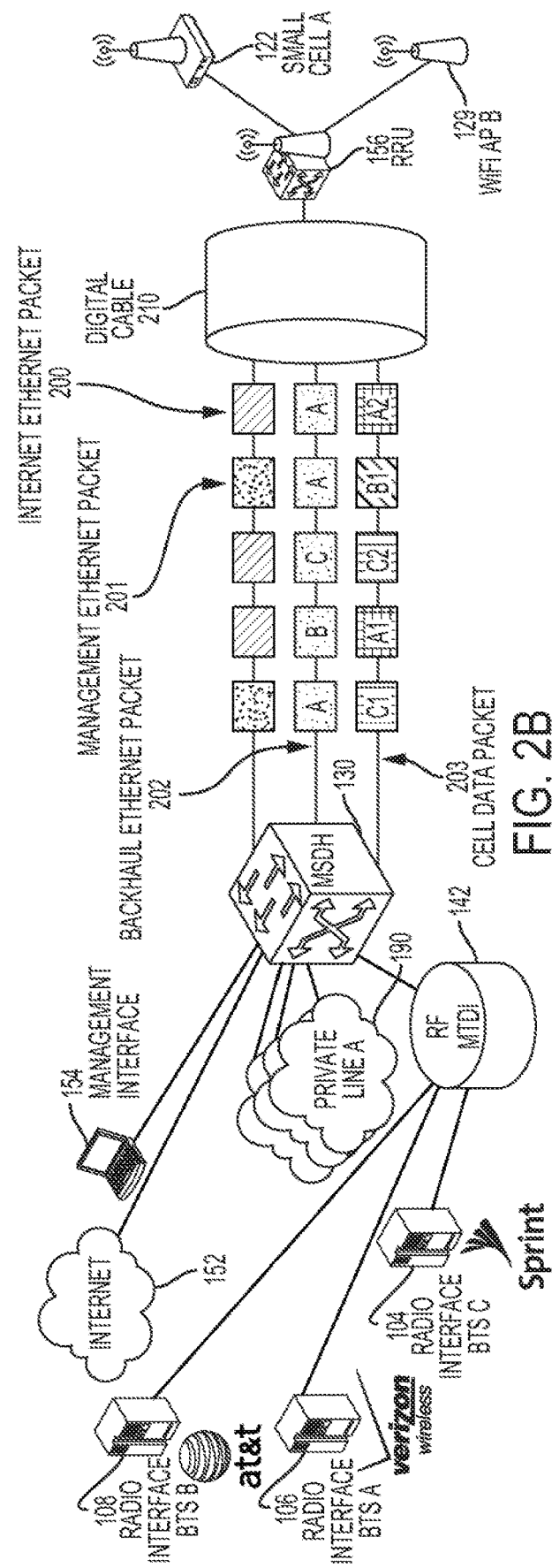
FIG. 2B shows a representation of the data flow in the digital link/cable between the MSDH and the RRU.

FIG. 2B shows a conceptual representation of the data flow in the digital link/cable 210 between the MSDH 130 and the RRU 156. It clearly shows the cell resource data (203), C1, A1, C2, B1, A2 which are components of the digital link's between the two modules. It also shows the Ethernet backhaul data packets 205 for the small Cell 122 and Wi-Fi AP 129 marked as ABC A etc., as well as Ethernet packets (201) for management and internet (200) purposes.

Figure 2C:
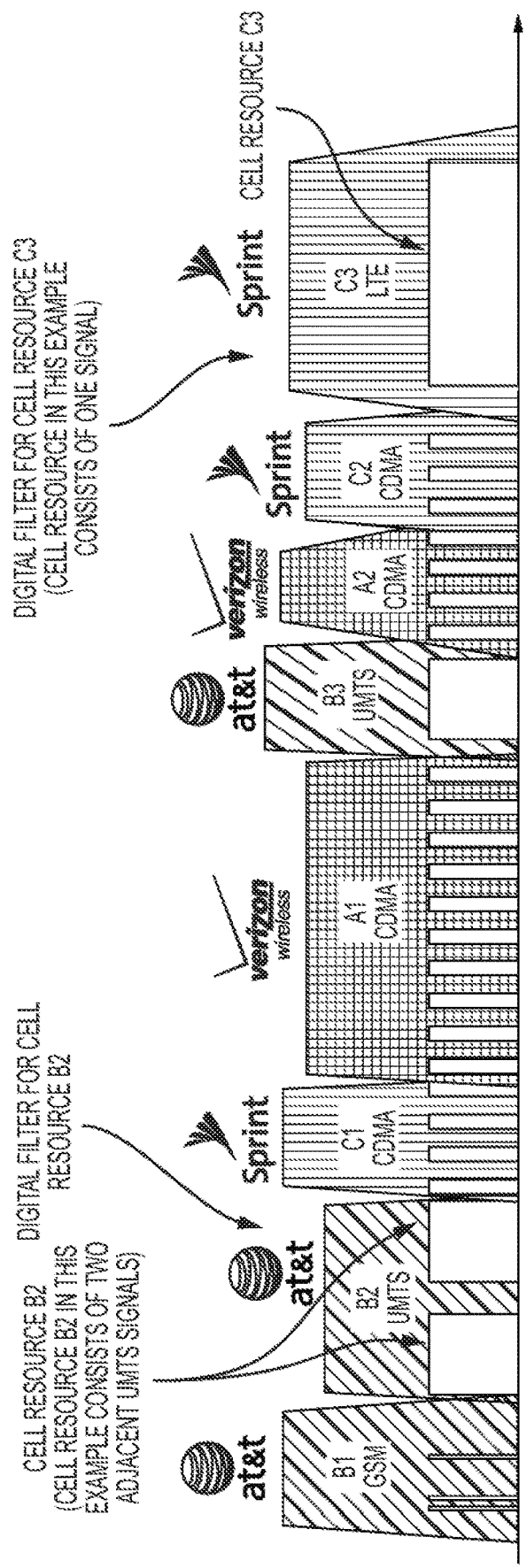
FIG. 2C shows how an RRU may filter each incoming signal using a specific digital filter matched to the technology and the bandwidth of each cell resource.

In the uplink direction, each MTDI performs the reverse operation. The MTDI receives a digital stream of digitized RF data samples representing the cellular uplink cell resources coming from the Remote Radio Units (RRUs) through MSDH 130. It combines signals destined for the same BTS input and converts them to uplink signals that are sent to the relevant s BTS. In the uplink each MTDI may have the same structure of cell resources and digital filters associated with them which is a mirror image of the Downlink cell resources and digital filters just shifted in frequency to the uplink channels of each BTS. All this as depicted in FIG. 2C.

There are, for example, three functionally different MTDI modules: digital MTDIs that connect to BTS's through a digital interface such as digital fiber; RF MTDIs that interface using analogue RF signals with RF BTS's; and auxiliary BTS's that interface with auxiliary equipment. But the structure of cell resources and digital filters associated with them prevails in all the three MTDI modules.

MSDH 130 is the central hub of DCC-DAS 100. MSDH 130 receives the digital streams of cell resource data from the MTDI's and routes them to the various RRUs as directed by DAS controller 150. In the uplink direction, MSDH 130 performs the reverse operation. MSDH 130 receives data from the RRUs and directs it to the relevant MTDI which is then sent to the relevant BTS. Where the same cell resource is allocated to more than one RRU, the uplink signals from the RRUs are summed together in order to create a single combined uplink signal for that cell resource which is then sent to the MTDI.

As aforementioned, the MSDH 130 also handles Ethernet data which is used as the IP backhaul of the small cells (120, 122, and 124) and Wi-Fi APs (126, 128, and 129) and routes the data to Internet gateway 192 or VPN gateway 153.

Each RRU 156, 158, 160, and 162 is basically a multiple band, multiple technology digital repeater which receives a digital stream of cell resource data (digitized signals) from the MSDH 130, converts the data from IF signals to RF signals, and transmits the RF signals to one or more zones in the downlink direction. A zone is a geographical area covered by a single RRU output. Since an RRU may be connected to one or more antennas, a zone may be the area covered by one or more antennas which are all connected to the RRU. In the uplink direction, the RRU performs the reverse operation. The RRU receives RF signals, converts them to IF signals, digitizes the IF signal, passes the digitized IF signal through a digital filter bank consisting of the array of uplink cell resources and digital filters associated with them, and sends the resulting signal to MSDH 130.

The use of digital filtered cell resources allows the amount of data flowing through DCC-DAS 100 to be reduced, thus enabling more capacity in the cables. This is due to the fact that only the output of digital filtered cell resources is converted to serial data and not the whole spectral bandwidth of each specific band. The saving in the data quantity becomes significant, particularly when only one or two operators are involved and their assigned frequencies are just part of the whole spectral width of the frequency band. Formatting of the digital data for transmission through DCC-DAS 100 may also include an additional compression stage to even further reduce the data flowing in the CPRI links. Furthermore, any conventional analog or digital DAS performs aggregation of noise and signals coming from all the RRUs which are serving the same sector of all BTSs in the same frequency band. Thus noise as well as interferences generated across the whole frequency band and cellular signals are all aggregated. The proposed algorithm teaches about performing the aggregation only on all identical cell resources (i.e. same central frequency same digital filter) serving the same BTS and the same sector. Thus in FIG. 2C for example a legacy DAS will aggregate all the noise, interferences and cellular signals data, of all the BTSs of across the whole PCS frequency band in all the RRUs serving the same sector. The proposed algorithm will aggregate only all-digital filters C3 data in all the RRUs serving the same sector and then carry on and perform separate aggregation for C2 in all the RRUs then A2 in all the RRUs etc.

The Signal to noise is now much better and signal to interferences ratio is much better.

In the near future, the European and America cellular operators will be deploying new technologies in legacy bands. For example, the 900 MHZ GSM band in Europe is being reallocated to allow multiple technologies in this band so that now it becomes 900 MHZ covering GSM/LTE/WCDMA. The same is happening to other bands worldwide. The DCC-DAS architecture enables the user to easily reallocate or re-farm the spectrum in each band according to the various technologies deployed in this band. All he has to do is reconfigure the filter bank and select specific digital filter characteristics with specific transfer functions desired for each digital filter to accommodate to the new technologies cell resources. Such reconfiguration can be done via management interface 154 which may be accessed locally or from a remote location though the internet or off-air through RF modems.

Further, it is easy to add additional BTS's to BTS farm 102. All a user must do is connect the new BTS to the system and allocate specific filters in digital filter bank 318 to the new cell resources associated with the new BTS. If the BTS contains two or more technologies or non-contiguous cell resources, then two or more digital filters should be allocated in the digital filter bank, with each one of the digital filters allocated to one cell resource.

DCC-DAS controller 150, together with the database routing module 182 and control and management interface 154, store and control the various configurations of DCC-DAS 100. Data base 189 also stores all the cell resources measurements as well as interferences measurements performed in each digital filter (FIGS. 2C and 2A) during the commissioning of the DCCDAS.

Figure 3:
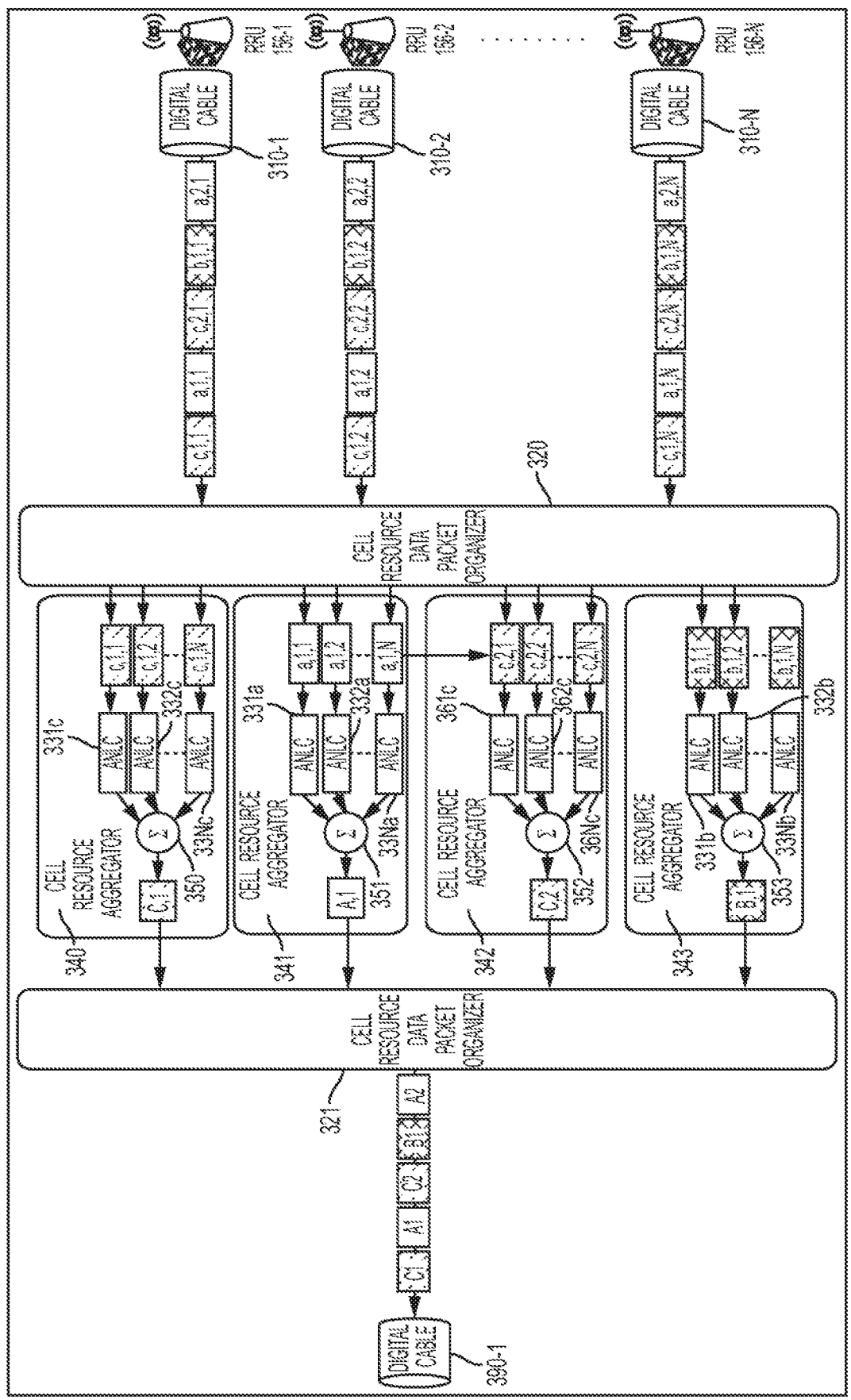
FIG. 3 shows a representation of the data flow in the digital link/cable (1-N) between the RRU and the cell resource packet organizer.

FIG. 3 depicts an exemplary embodiment of harmonizing noise aggregation functional block diagram. In the Uplink direction, each RRU 156 (1-N) converts each incoming received RF signal to an IF signal and then digitizes the IF signals and passes them through a digital filter bank. The RRU may filter each incoming signal using a specific digital filter matched to the technology and the bandwidth of each cell resource as shown in FIG. 2C. A cell resource is defined as a contiguous piece of spectrum that the operator of the DCC-DAS wishes to distribute, for example, consisting of one or more wireless signals of the same wireless cellular technology type. However, this is just an example. A cell resource can also be any contiguous piece of spectrum in the frequency bands of the DCC-DAS that the operator wishes to digitize and distribute via the DCC-DAS. FIG. 2A shows as an example the cell resources in the US PCS frequency band. A1 and A2 are Verizon™ cell resources in the PCS band; B1, B2, and B3 are AT&T™ cell resources in the PCS band; and C1, C2, and C3 are Sprint™ cell resources in the PCS band. The RRU then converts the digital filtered signals to a digital stream of data samples (e.g. I/Q data samples) which are routed to MSDH 130.

FIG. 3 shows a conceptual representation of the data flow in the digital link/cable 310 (1-N) between the RRU 156 and the cell resource packet organizer 320 (Exemplary implementation is depicted in FIG. 2B and may be implemented within the MSDH 130). It clearly shows the cell resource data c, 1, 1; a, 1, 1; c, 2, 1; which are components of the digital link's between the two modules. In this exemplary embodiment the X, Y, Z cell resources indexes are representation of:

X is the cell resources operator ID ("a" is Verizon™, "b" is AT&T™ and "c" is Sprint™)
Y is the cell resources number ID per operator.
Z is the cell resources RRU origin.

The cell resource packet organizer 320 is responsible for the de-serializing of the cell resource packet and feeding the cell resource aggregator 340 341 342 343. Cell resource aggregators 340-343 are responsible for a specific cell resource aggregation; they receive from the cell resource packet organizer 320 the selected cell resource associated with a specific sector and aggregate them thru a summation function 350-353. The Automatic Noise Level Control (ANLC 331c ... -33Nb)) modules are responsible for the adjustment of the cell resources noise coming from the various RRUs 156 (1-N) which are serving the same sector to a targeted pre-aggregation noise level. The targeted pre-aggregation noise level is determined by the targeted post aggregation noise level to be delivered to the base station sector port and the number of aggregated cell resources (for example number of aggregated RRU associated to the specific sector). Uplink noise may be adjusted not purely on thermal noise level but also on the total noise (thermal and interference) and signal level per-one or more cell resource. Performing corresponding gain adjustment process on the sum of signal and noise level in each digital filtered cell resource rather than just only on the thermal noise of each digital filtered cell resource enables the DAS controller 150 to achieve lower aggregated noise levels, better signal to noise levels and improved uplink capacity performance (For example assigning a relative less gain to a cell resource in which there is an interference or excessive external noise).

The cell resource packet leaving the cell resource aggregator 340-343 no longer has the cell resources RRU origin (Z) since it may consist of multiple aggregated RRU cell resources. The cell resource packet organizer 321 is responsible for the re-serializing of the cell resource packet.

Algorithm and Method Description, for Distributed Antenna System Noise Aggregation and Management.

The quest for the optimal capacity transport DAS network begins with the built-in ability to measure, analyze and understanding noise and noise rise in the network. Since noise rise phenomenon can originate from either an internal or external source, the network needs to be able to identify its origin, analyze and automatically respond.

Commonly, prior art DAS networks did not measure or monitor noise. The monitoring function was not part of the DAS network and was performed by the relevant base stations only after an aggregation from the entire DAS sector antennas. Monitoring the aggregated noise (and particularly when performed outside the DAS by the BTS) rather than the pre-aggregation noise (as depicted in FIG. 3) limits the networks ability to handle the noise source; this very limited monitoring capability cannot be the base for optimal capacity transport for DAS network.

DAS noise measurement analyzing and monitoring requires a new way of thinking, noise in the uplink has to be monitored by the DAS controller and also no longer a single point of testing (post aggregation) but rather the network will measure and analyze the noise in every step of its journey from the antenna to the base stations in the head end room (as depicted in FIG. 3).

Monitoring the noise pre-aggregation brings to light new information following new methods for handling the noise in an effective manner enabling essentially a lower noise level and better signal to noise ratio in the distributed base stations resulting in better performance DAS network and higher capacity and throughput.

Noise measurement is not trivial, DAS networks and in particular multi host DAS networks are complex, they carry different technologies and different frequencies. In general the common goal in noise measurement is to separate desired uplink mobile user signal from the total received energy. The separation can be accomplished by disabling any uplink desired signals during the system commissioning phase when noise measurements are performed. This can be achieved by disabling any downlink signal or having the BTSs work in a zero traffic mode during the commissioning phase.

Figure 7:
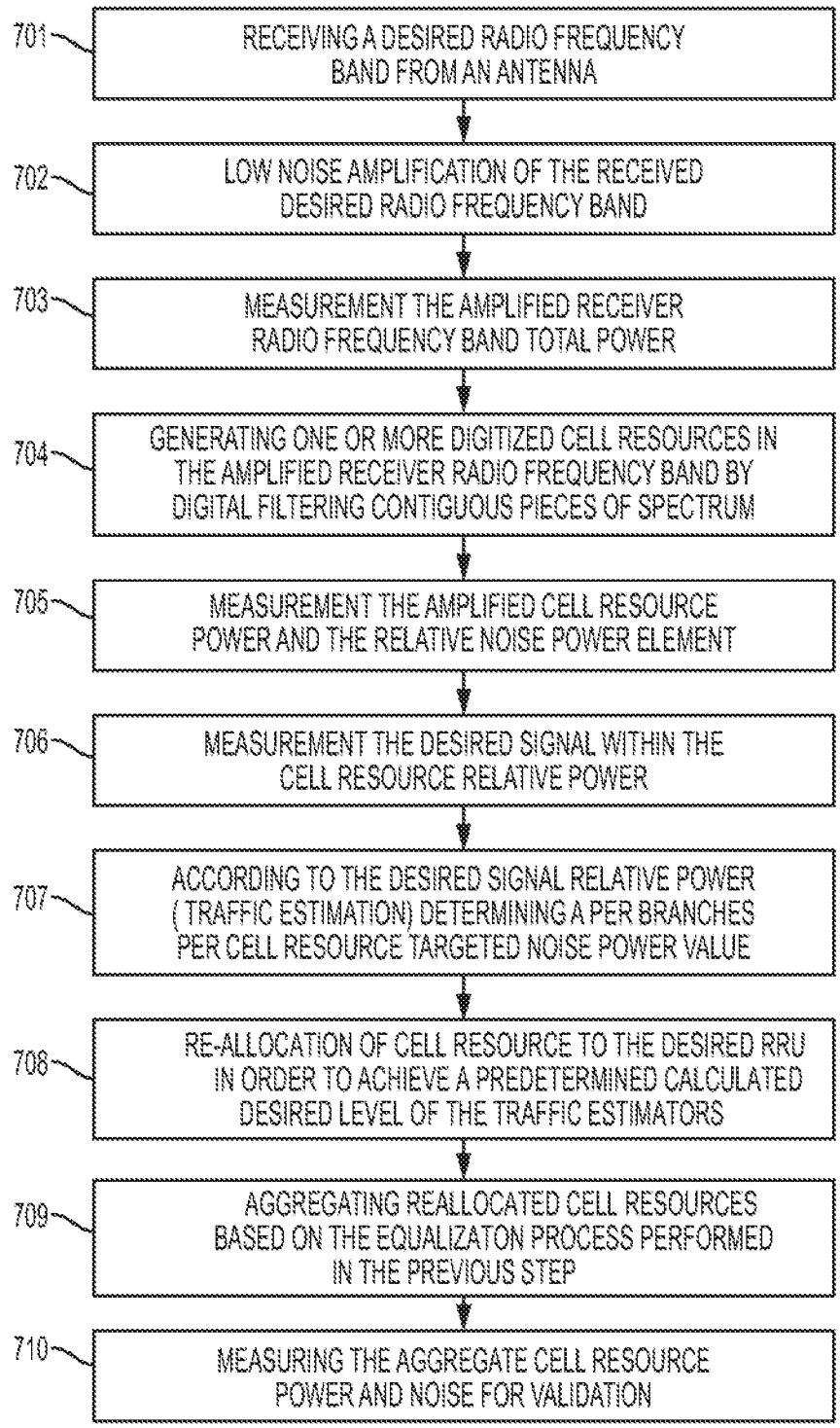
FIG. 7 depicts RRR reallocation of cell resources in order to achieve an optimum signal to noise ratio per sector.
Figure 9:
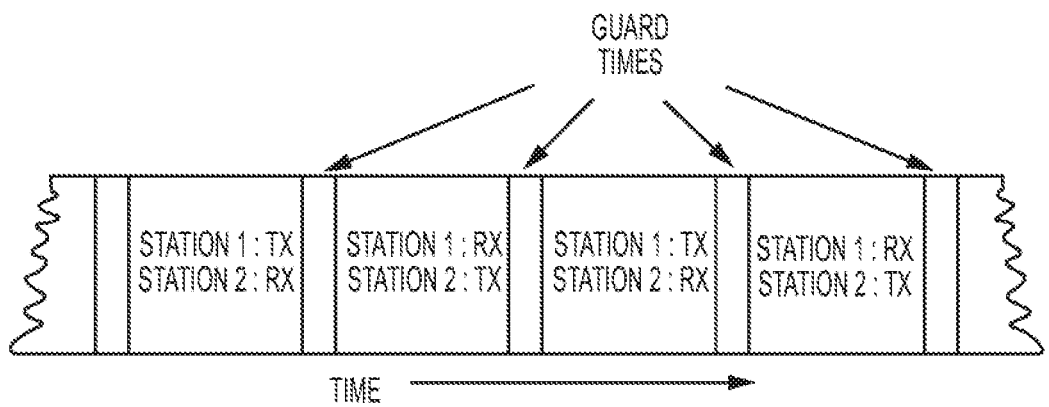
FIG. 9 depicts a representation showing the separation of the total received energy from the desired signal by synchronized guard time noise measurement.
Figure 12:
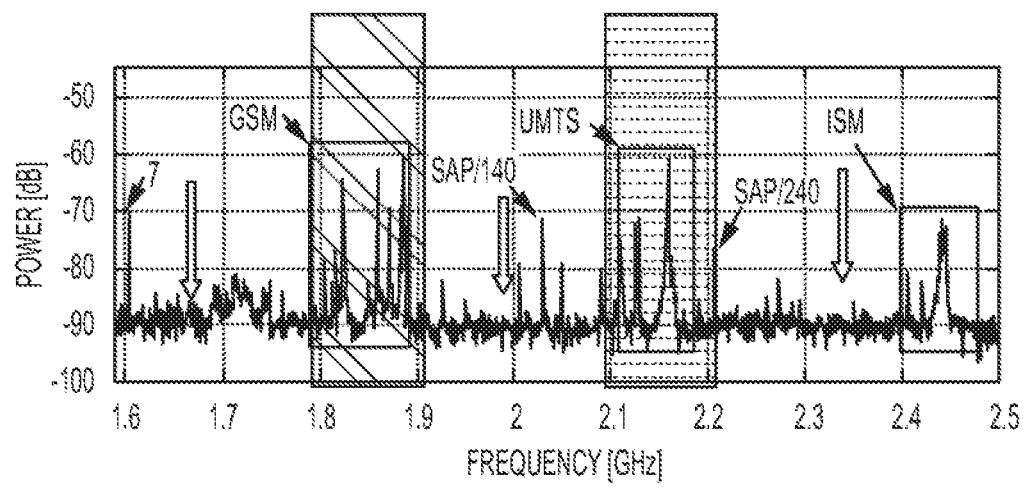
FIG. 12 depicts prior art DAS band specific noise power measurement.

When the DAS becomes operational the operators may be reluctant to disable mobile up link traffic. Thus Real time undisruptive noise separation and management may be accomplished by a full decoding of the desired signal as implemented in the base station or in a simplified manner like separating the desired uplink signal by performing correlation with for example the spreading code of the WCDMA signal. (As shown in FIG. 7 for WCDMA signals); such procedures can also include partial decoding, time based noise measurements, in TDD guard time as an example (FIG. 9) frequency based noise measurements, in GSM the unallocated intervals between carriers as an example (FIG. 12). Noise monitoring can further be assisted not only by the instantaneous noise measurement, but by a sequence of noise measurements can contain additional essential information such as noise trends and over time behavior. Noise behavior is determined by multiple factors, the most essential are the sources. The noise generated by interferences unlike internal white noise often varies in amplitude and quite often will not be constant over the frequency bands.

Figure 11:
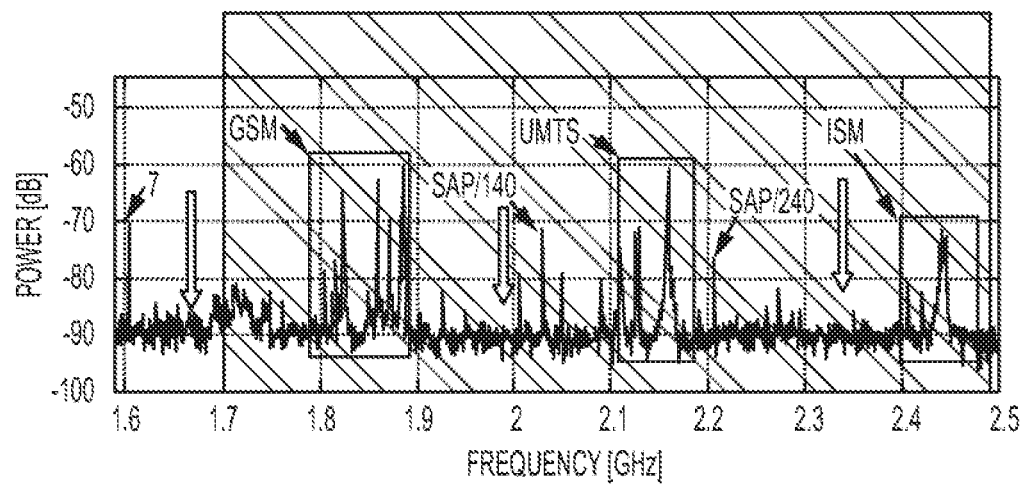
FIG. 11 depicts prior art DAS wideband noise power measurement.
Figure 13:
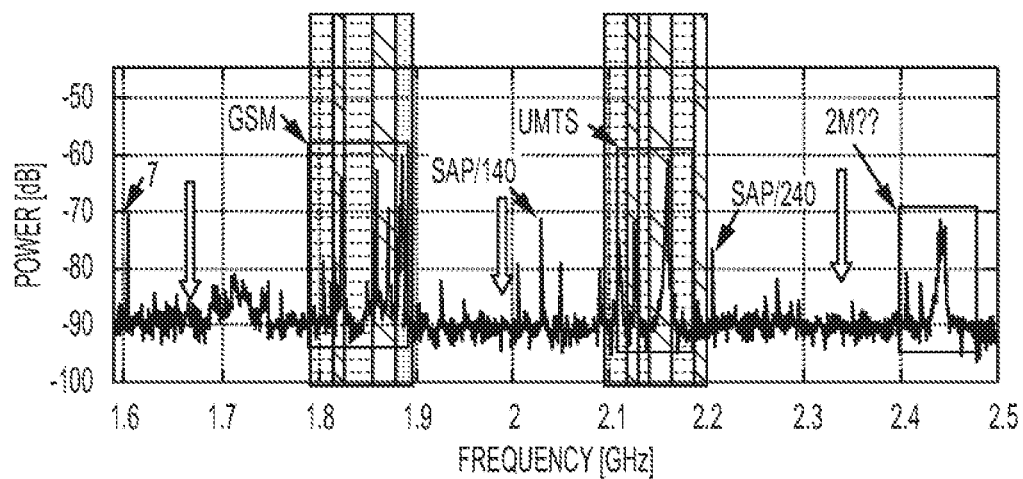
FIG. 13 depicts cell resource noise power measurement according to the present invention.

Unlike the prior art DAS networks which may measure wideband noise power (for example all the noise between 1700 MHz and 2500 MHz: FIG. 11) or per band (for example all the DCS noise between 1700 MHz and 1800 MHz and separately all the UMTS noise between 1900 MHz and 2000 MHz FIG. 12), the proposed algorithm for noise management performs the noise and interference measurements separately for one or more or all of the cell resources digital filters and only across the bandwidth of each of the digital filters which are being aggregated (FIG. 13). Wideband or per band measurements as performed in prior art DAS eliminate the ability to perform any noise measurement and optimization per each cell resources manage the noise in the DAS network.

Figure 14:
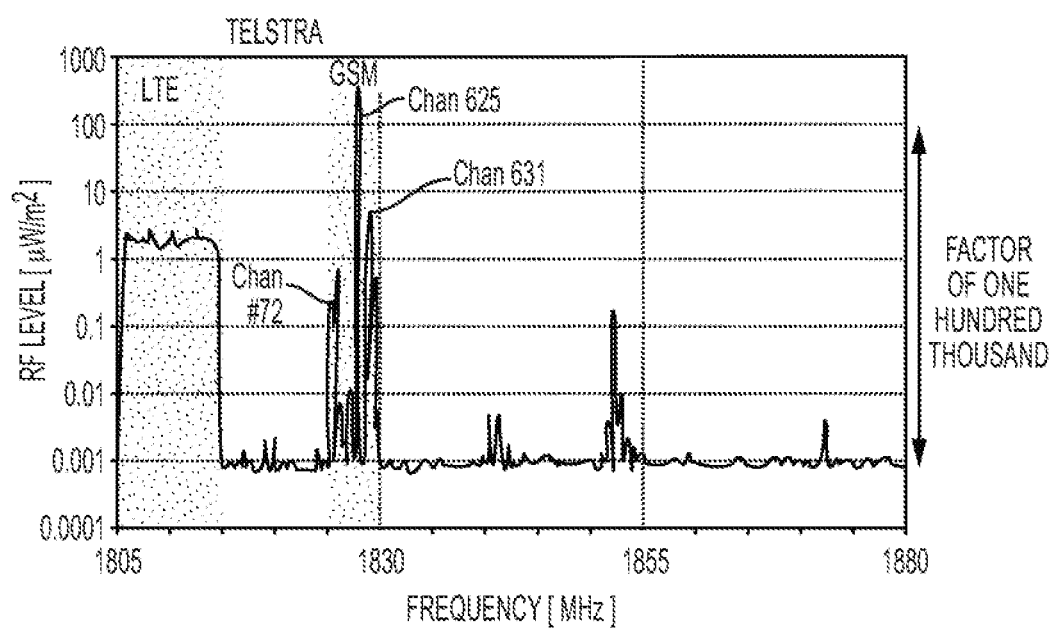
FIG. 14 depicts DAS distributed different technologies in the DCS frequency band requiring different noise aggregation for optimal performance.

In many cases the noise is localized, affecting specific antennas in specific frequencies. The ability to measure the noise separately for each zone (remote radio head) and for each cell resource (contiguous piece of spectrum) enables a better noise harmonizing aggregation which leads to better DAS network performance (FIG. 14).

Harmonizing Noise Aggregation (Calibration and Equalization)

By harmonizing we mean a running process of smart weighted aggregation of noise and signal resources which aims to achieve an optimal signal to noise ratio in varying traffic and interference conditions.

Prior art DAS network was designed under the assumption that the predominant noise origin is the thermal noise, and therefore in order to achieve optimal noise performance, the gain from the antenna to the point of aggregation (pre-aggregation gain) of all aggregate antennas needs to be equal. The equalization performed in the prior art DAS networks (for example in an optical master units or central HUBS) was typically done by manual or automated procedure that adjusted the down link gain in order to achieve the desired transmitted power, following a procedure to correspondingly adjust the uplink pre-aggregation. This prior are DAS open loop gain setting and equalization procedures suffer from all the problems of an open loop process. It is sensitive to gain variations caused for example by incorrect calibration, temperature or hardware failure. This prior are DAS open loop gain setting and equalization procedures cannot detect nor readjust the gain when there are interferences.

Pre-aggregation noise harmonization is a critical step in the quest for achieving optimal performance in DAS networks. Distributed antenna system aggregates all the antennas serving a sector into a common port connected to the distributed base station sector port. The proposed algorithm takes advantage of its multipoint cell resources noise measurement, thus harmonizing the noises prior to the aggregation by individual cell resources gain adjustment. Since the aggregation process in the DAS network may be centralized but can also be distributed, noise harmonizing is required in all aggregation junctions. The noise harmonizing process is an ongoing process that constantly monitors the uplink noise and performs adjustments accordingly.

Noise harmonization process is an optimization process, which may consist of the following layers:

Layer 1 which may be divided into two sub-layers:

1.1. Adjust the uplink cell resources noise coming from the various antennas and RRUs which are serving the same sector to an equal pre-aggregation noise level, the noise and interference may be measured by disabling any downlink signal or having the BTSs work in a zero traffic mode during the commissioning phase. The pre-aggregation targeted noise level is determined by the number of aggregated cell resources (for example number of aggregated RRUs associated to the specific sector) and the targeted post aggregation noise level to be delivered to the base station sector port. Uplink gain may be adjusted not purely on thermal noise level but also on the total noise which may be thermal and interference.

1.2. Adjust the uplink cell resources noise coming from the various antennas and RRUs which are serving the same sector to an equal pre-aggregation noise level. This is layer is performed when the network is operational. The noise and interference may be measured by various techniques aimed to separate and distinguish the noise and interference from the desired uplink signal. The pre-aggregation targeted noise level is determined by the number of aggregated cell resources (for example number of aggregated RRUs associated with the specific sector) and the targeted post aggregation noise level to be delivered to the base station sector port. Uplink gain may be adjusted not purely on thermal noise level but also on the total noise which may be thermal and interference. Performing corresponding gain adjustment process on each digital filtered cell resource rather than just only on the thermal noise of each digital filtered cell resource enables the DAS controller 150 to achieve lower aggregated noise levels, better signal to noise levels and improved uplink capacity performance.

Noise rising failure caused by one or more malfunctioning RRUs and or interferences from external sources penetrating the DAS through one or more of the RRU antennas may in severe cases affect a whole BTS sector performance. Thus aggregation of a plurality of antennas and plurality of RRUs without noise harmonization process is one of the major common critical failure in Prior art DAS network. The proposed algorithm for harmonization process enables the protection of the distributed base station sector by measuring separately the noise contribution of each cell resource in each RRU and performing a harmonization process on all these per cell resources digital filters noise sources.

Layer 2: The proposed algorithm enables a more advanced process in which the pre aggregation gains of lower uplink traffic, or no uplink traffic, digital filtered cell resources are proportionally reduced. This pre-aggregation per cell resource weighted gain adjustment enables the reduction of the contribution of lower traffic or no traffic uplink digital filtered cell resources noise to the post aggregate noise.

Figure 4A:
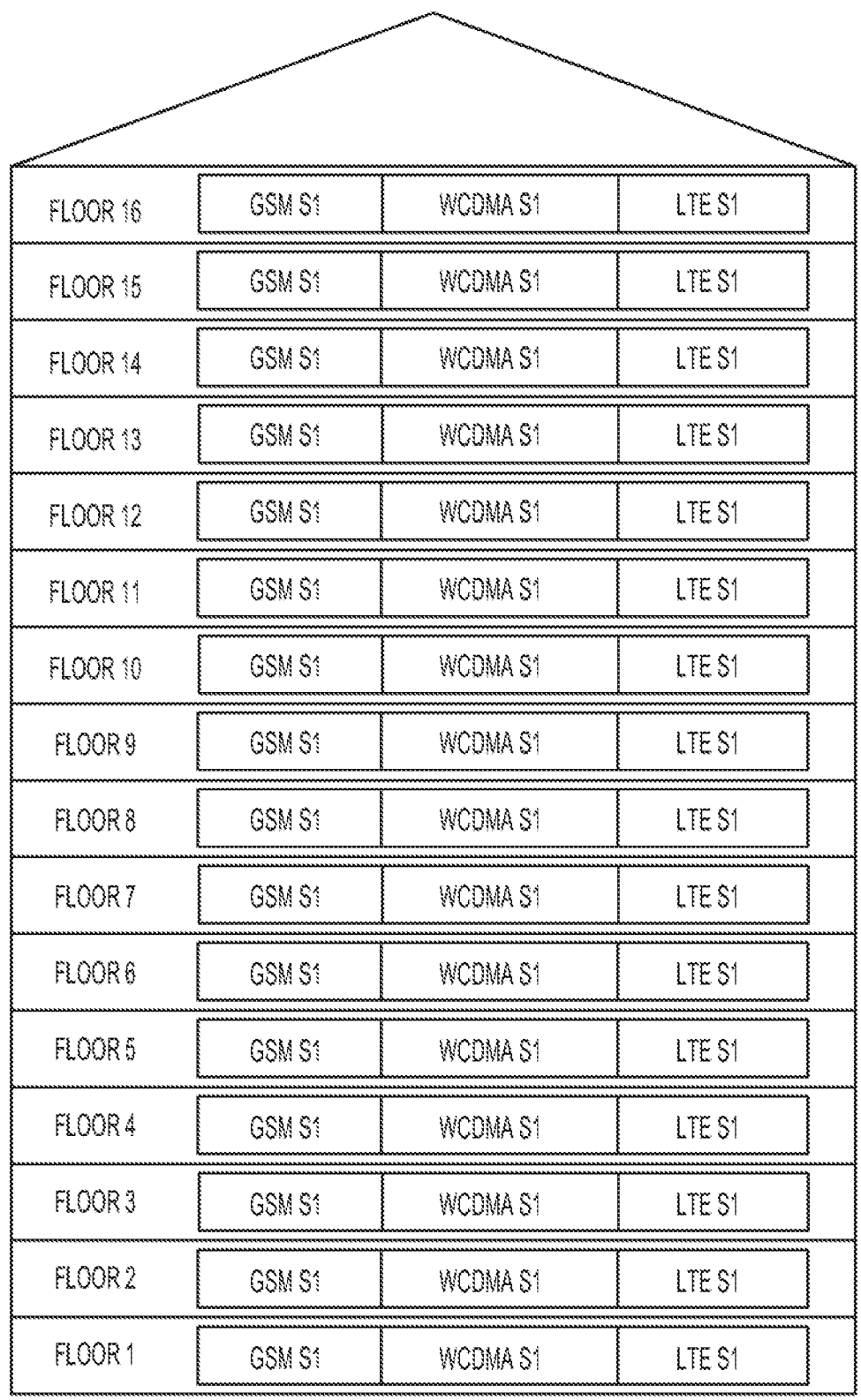
FIG. 4A depicts cell resource allocation in a prior art DAS network.
Figure 4B:
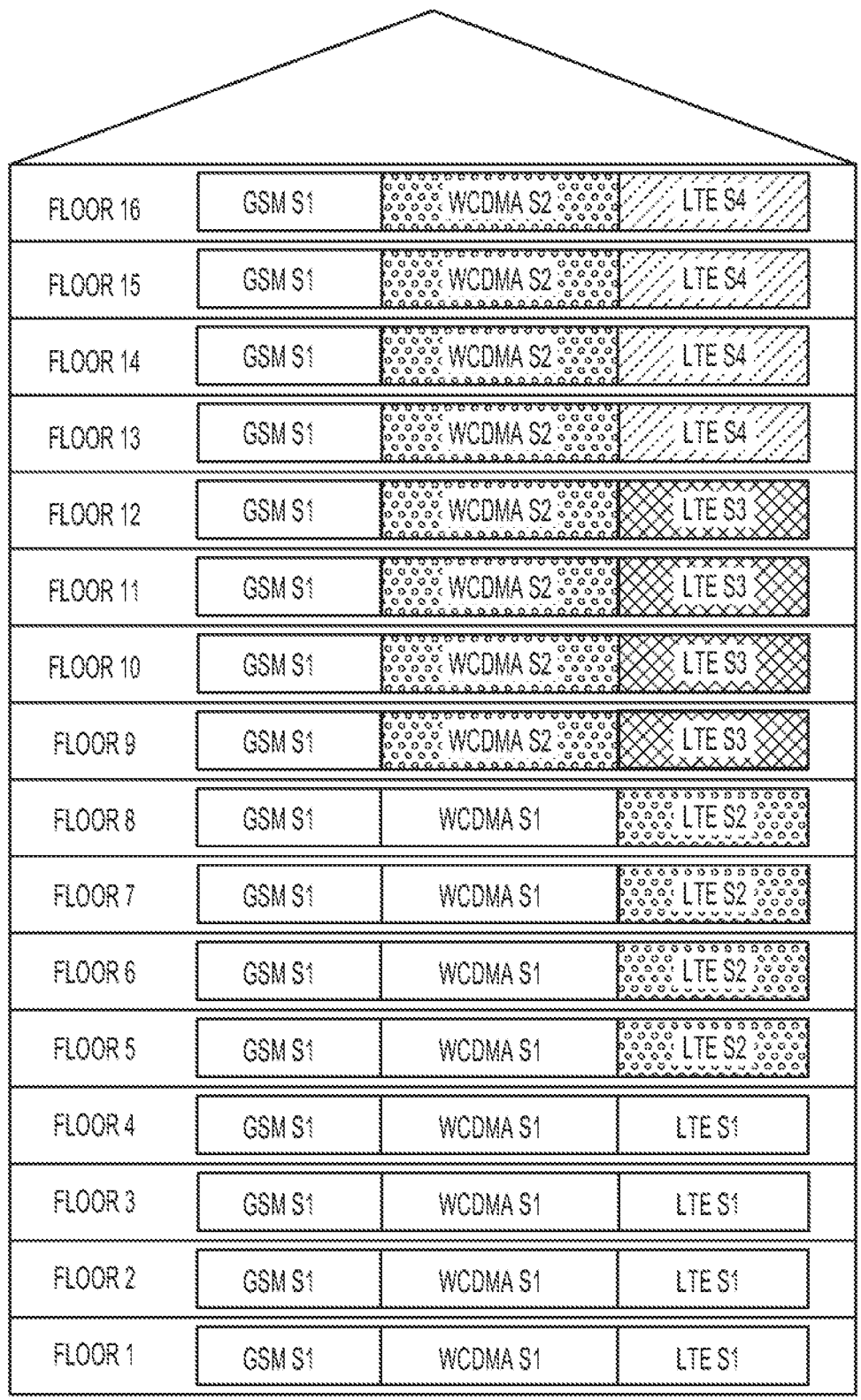
FIG. 4B depicts an optimum noise driven distributed network according to the present invention.
Figure 4C:
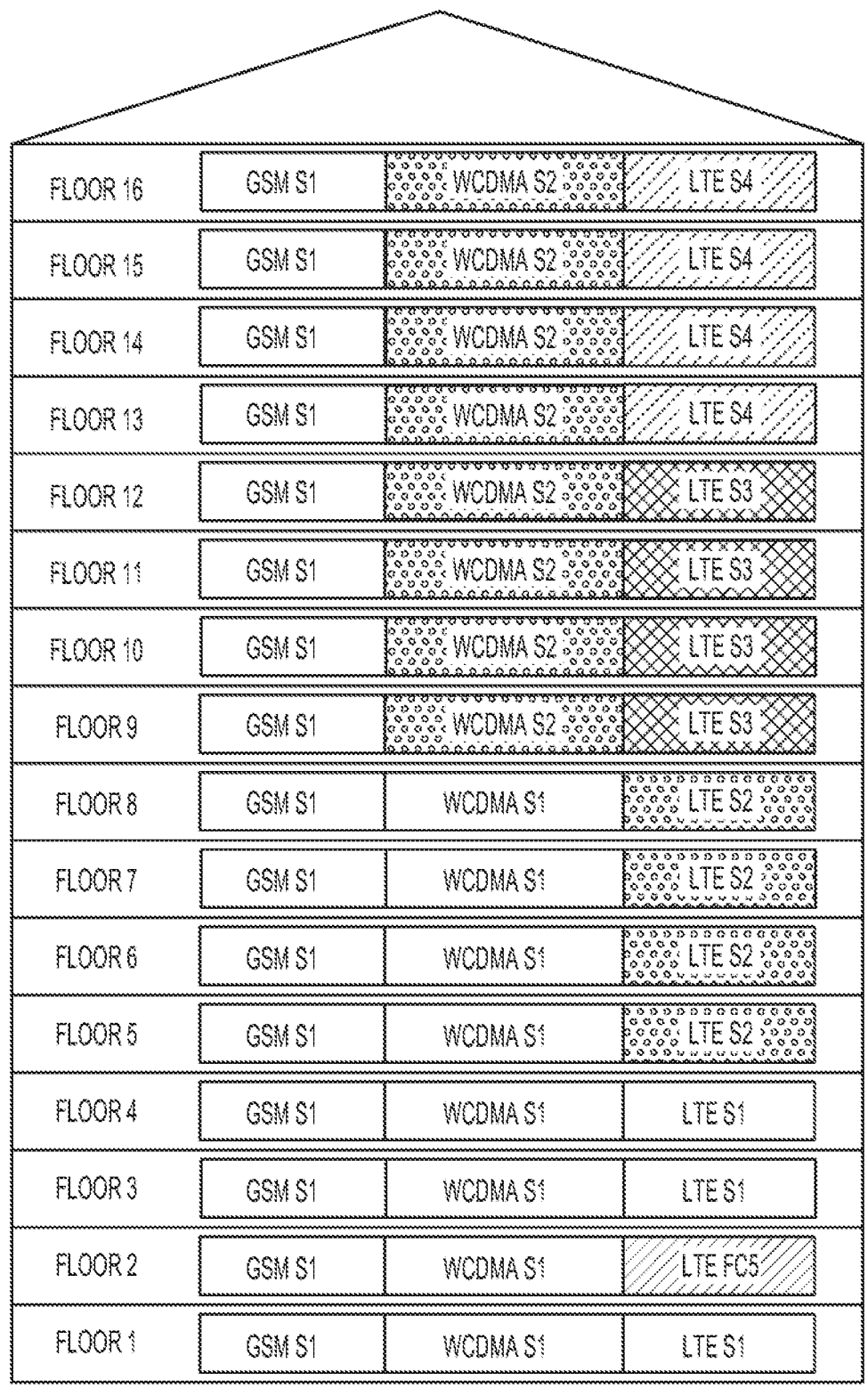
FIG. 4C depicts a femto-cell enhanced optimum noise drive distributed network according to the present invention.

Layer 3: The proposed algorithm enables furthermore an advanced process in which unlike in prior art DAS networks where predesigned for a predetermined sector allocation (sectorization). For example in FIG. 4A all the floors (1 to 16) where all evenly distributed. This structure of distribution resulted in evenly noise aggregation, resulting in reduced capacity to new technologies such as LTE that suffer heavily from low signal to noise ratio. The new advanced process proposed algorithm enables for the first time a dynamic noise aggregation process, taking in consideration the desired signal to noise ratio per cell resource. This new aggregation functionality is demonstrated in FIG. 4B where all technologies are no longer aggregating the same number of antenna (RRU) resulting in the same noise levels. Higher demanding signal to noise ratio technologies such as LTE, where sector densification over the same DAS resulting in a dramatic improvement of the signal to noise ratio (An example is depicted FIGS. 4A and 4B. Where FIG. 4A depict the scenario before the sector densification, and FIG. 4B depicts the scenario after sector densification, in which the number of aggregated RRUs was reduced from 16 to 4 resulting in a 6 dB signal to noise improvement). The farther more advanced process proposed algorithm which deals separately with each cell resources support small-cell enhancement (LTE FC 5 in FIG. 4C) which enables for example the dedication of a "full BTS sector cell resource" to a specific floor (second). The "full cell resource sector" dedication eliminates any noise aggregation contribution for to this specific floor, resulting in this case in a dramatic improvement of the signal to noise ratio by a factor of 12 dB (reducing the number of aggregated RRUs from 16 to 1 floor).

Detailed Description of the Algorithm
 1. The algorithm for harmonizing noise aggregation and management in Distributed Antenna System may focus on achieving the following goals: Noise aggregation algorithm designated to achieve minimum aggregated noise by equalizing pre-aggregation noise levels.
 2. Noise aggregation algorithm designated to achieve optimal aggregate noise in traffic conditions by allocating unequal weighted pre-aggregation gain adjustment.
 3. Noise aggregation algorithm designated to achieve optimum signal to noise ratio by cell resource re-allocation, the redistribution of the cell resource enable optimum signal to noise ratio by reducing the number of aggregated antennas for a sector distributed in a high uplink traffic location.

Figure 5:
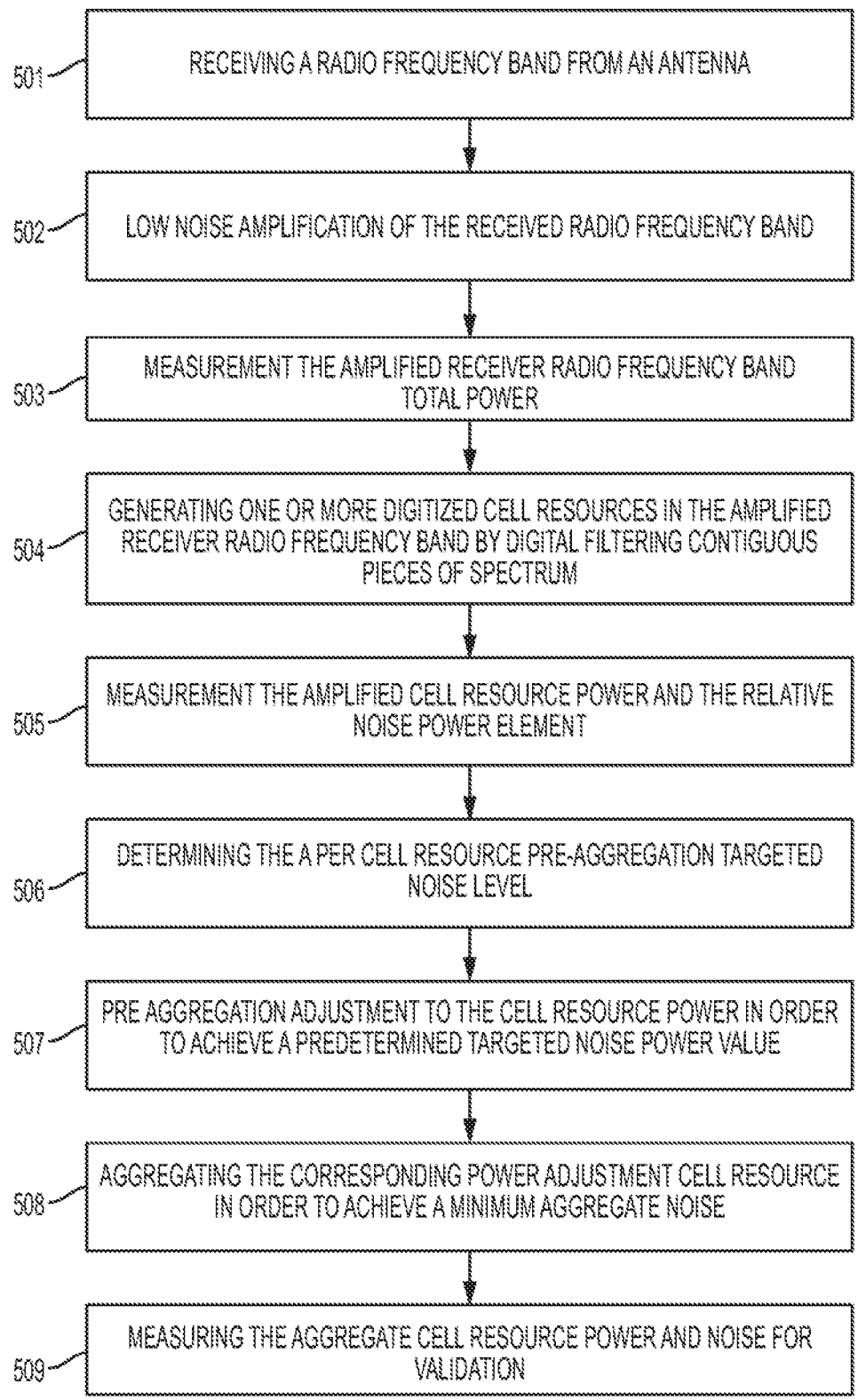
FIG. 5 depicts a flowchart showing pre-aggregation adjustment to the cell resource power in order to achieve minimum aggregate noise.

Goals 1, Noise level measurements and per cell resource pre-aggregation gain adjustment when the noise management is performed by disabling the uplink mobile signal or separating the uplink mobile signal from the total noise in the one or more digital filtered cell resource of one or more RRUs corresponding to the same cell resource in the BTS same sector and adjusting the gain of all these cell resource digital filtered cell resource to the same minimal pre-aggregation level. Thus the pre-aggregation algorithm achieves minimum aggregated noise by equalizing pre-aggregation noise and setting them to a minimal level. This algorithm is depicted in FIG. 5 and and may consist of the following steps:

Step 1—Block 501 in FIG. 5—Receiving a radio frequency band from an antenna. In some implementations of DAS networks the antenna is part of the remote unit. In others, there is a low loss in the coaxial cables and other combining elements connecting the one or more antenna to the remote radio head.

Step 2—Block 502 in FIG. 5—Low noise amplification of the received radio frequency band. Low noise amplification is required to optimize the noise Fig. of the uplink receiver and to raise the power level of the received signal.

Step 3—Block 503 in FIG. 5—Measuring the amplified receiver radio frequency band total power. Measuring the total amplified receive radio frequency band power, is important in order to avoid receiver saturation. Total band power may also assist for fast adjustment reaction to noise or interference rising.

Step 4—Block 504 in FIG. 5—Generating one or more digital filters (digital filter bank) and passing and filtering the digitized cell resources in the amplified receiver radio frequency band by the digital filter bank digital filtering contiguous pieces of spectrum. Noise behavior is determined by multiple factors, the most essential are the sources. The noise often varies in amplitude and typically will not be constant over frequency. Unlike the wideband noise power measurement (FIG. 11) or band specific (FIG. 12) measurement in prior art DAS networks, these new noise measurement step is always performed on a desired filtered contiguous pieces of spectrum and performed separately on each cell resource (FIG. 13). Wideband or band specific measurement eliminates the ability to selectively manage the noise in the DAS network.

frequencies. The ability to measure the noise separately for antenna (remote radio head up to the antenna) and for each cell resource (contiguous piece of spectrum) enables better noise harmonizing aggregation which will lead to better DAS network performance.

Figure 8:
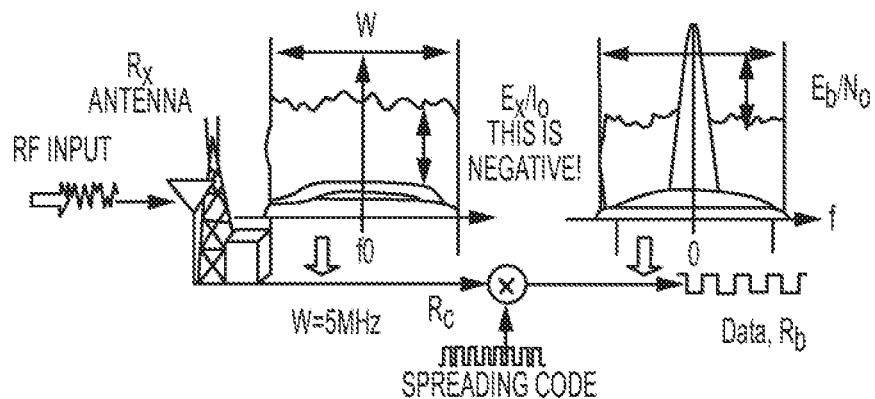
FIG. 8 depicts a representation showing the separation of the total received energy from the desired signal by spreading code decoding.
Figure 10:
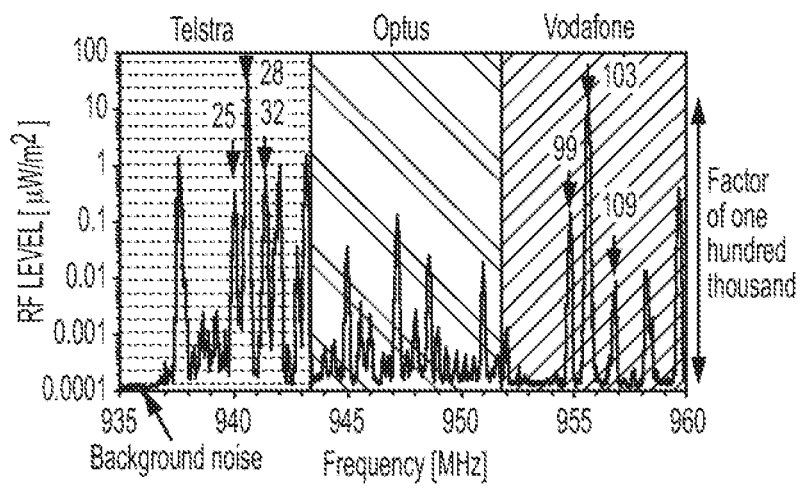
FIG. 10 depicts a representation showing the separation of the total received energy from the desired signal by free transmission frequency guard noise measurement.

Step 5—Block 505 in FIG. 5—Measuring the amplified cell resource power and the relative noise power element in the output of each digital filter. Noise measurement is not trivial, DAS networks and in particular multi host DAS networks are complex, they carry different technologies and different frequencies. In general the common goal in noise measurement is to separate the total received energy from the desired signal. The separation can be accomplished by:

a. The noise and interference may be measured by disabling any downlink signal or having the BTSs work in a zero traffic mode during the commissioning phase.
  b. A full decoding of the desired signal as implemented in the base station or in a simplified manner like separating the desired uplink signal by performing correlation with for example the spreading code of the WCDMA signal. (As shown in FIG. 8 for WCDMA signals); such procedures can also include partial decoding, time based noise measurements, in TDD guard time as an example (FIG. 9) frequency based noise measurements, in setting uplink digital filters in non-operational or the un-allocated frequency intervals between carriers as in the GSM example (FIG. 10).

Step 6—Block 506 in FIG. 5—Determining a per cell resources pre-aggregation targeted noise level. The pre-aggregation targeted noise level is determined by the desired post aggregation noise level to be delivered to the base station sector port and the number of aggregated cell resources (for example number of aggregated RRU associated to the specific sector).

Step 7—Block 507 in FIG. 5—Pre aggregation adjustments to the cell resource power, in order to achieve a predetermined targeted noise power value.

Noise harmonization process is an equalization process, constantly adjusting the cell resources noise to an equal pre-aggregation level. The equalization enables a more advanced process in which the noise is adjusted not purely on noise level but also considering per branch noise Fig. and passive and active nonlinearity. Considering also external radiation noise may in severe cases protect a whole distributed sector. The noise harmonizing process may be an ongoing process, noise cell resources varies and over time it is subjected to its source and receiving channel. The proposed algorithm network ongoing noise harmonizing process automatically compensates the relevant noise variations.

Step 8—Block 508 in FIG. 5—Aggregating the corresponding power adjustment cell resource in order to achieve a minimum aggregate noise. The corresponding power adjustment aggregating takes advantage of its multipoint selective noise measurement, thus harmonizing the noises prior to the aggregation by individual cell resources gain adjustment. Since the aggregation process in the DAS network may be centralized but can also be distributed, noise harmonizing is required in all aggregation junctions. Cell resources noise harmonizing aggregating process enables the protection of the distributed base station sector by eliminating the noise contribution of the specific faulty cell resources Step 9—Block 509 in FIG. 5—Measuring the aggregated cell resource power and noise level for validation. By the end of this step all the noise levels of each digital filtered cell resource in each band from each antenna (RRU) in the DAS network are validated recorded and stored.

Figure 6:
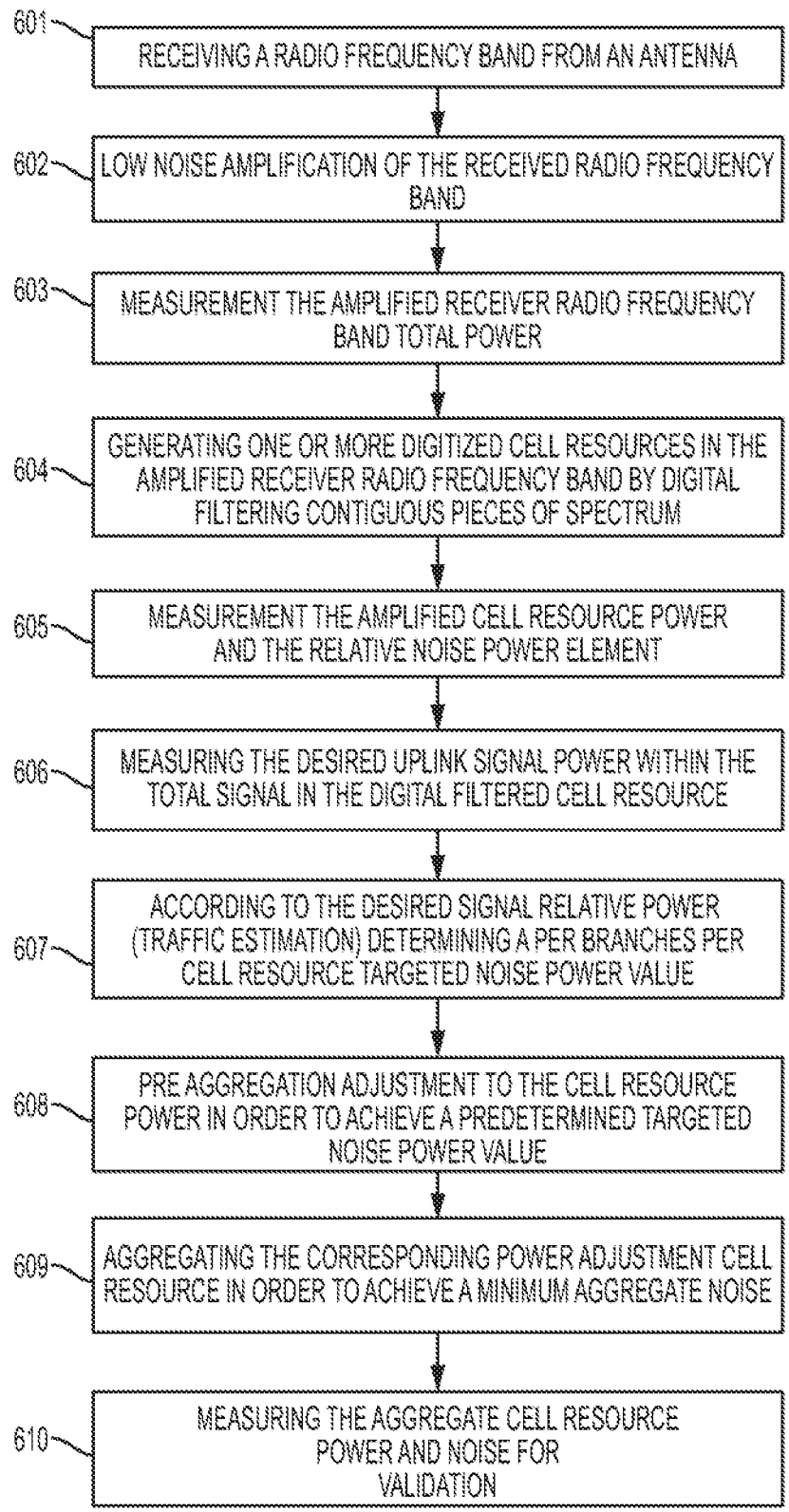
FIG. 6 depicts a flowchart showing pre-aggregation traffic corresponding to the cell resource power in order to achieve minimum aggregate noise.

Goals 2, Noise level measurements and per cell resource pre-aggregation adjustment when the noise management is performed by separating the total received energy from the desired signal under traffic conditions. The algorithm achieves optimal aggregated noise by applying traffic related unequal weighted pre-aggregation gain factors to each digital filter cell resource This algorithm is depicted in FIG. 6 and and may consist of the following steps:

Step 1—Block 601 in FIG. 6—Receiving all the uplink mobile signals in a radio frequency band from an antenna (Similar to Step 1—Block 501 in FIG. 5).

Step 2—Block 602 in FIG. 6—Low noise amplification of all the signals in received in the radio frequency band (Similar to Step 2—Block 502 in FIG. 5).

Step 3—Block 603 in FIG. 6—Measurement the amplified receiver radio frequency band total power. (Similar to Step 3—Block 503 in FIG. 5).

Step 4—Block 604 in FIG. 6—Generating one or more digital filters (digital filter bank) and passing and filtering the digitized cell resources in the amplified receiver radio frequency band by the digital filter bank digital filtering contiguous pieces of spectrum (Similar to Step 5—Block 504 in FIG. 5).

Step 5—Block 605 in FIG. 6—Measurement the amplified cell resource power (desired and noise) and relative noise power element (similar to Step 5—Block 505 in FIG. 5).

Step 6—Block 606 in FIG. 6—Measuring the desired uplink composite signal power within the total signal in the digital filtered cell resource. Desired uplink signal power measurement is not trivial, DAS networks and in particular multi host DAS networks are complex, they carry different technologies and different frequencies. In general the common goal in desired uplink signal power measurement is to separate the total received energy from the desired signal. The separation can be accomplished by:

a. The noise and interference may be measured by disabling any downlink signal or having the BTSs work in a zero traffic mode during the commissioning phase.
  b. A full decoding of the desired signal as implemented in the base station or in a simplified manner like separating the desired uplink signal by performing correlation with for example the spreading code of the WCDMA signal. (As shown in FIG. 8 for WCDMA signals); such procedures can also include partial decoding, time based noise measurements, in TDD guard time as an example (FIG. 9) frequency based noise measurements, in setting uplink digital filters in non-operational or the un-allocated frequency intervals between carriers as in the GSM example (FIG. 10).

Step 7—Block 607 in FIG. 6—According to the desired signal power (traffic estimation) determining per antenna (or per RRU in case of multiple antenna per RRU) per cell resource the targeted noise power value. The pre-aggregation noise level per cell resource is determined by the number of aggregated cell resources (for example number of aggregated RRUs associated to the specific sector) and the cell resource desired signal power (traffic estimation) and the desired post aggregation noise level to be delivered to the base station sector port.

Step 8—Block 608 in FIG. 6—Pre aggregation adjustment to the cell resource power in order to achieve a predetermined targeted noise power value. The harmonization enables a more advanced process in which the noise is adjusted not purely on noise level but also considering the signal level (up-link traffic) per antenna (or per RRU in case of multiple antenna per RRU) Setting the pre-aggregation desired noise power value for a lower desired signal power (traffic estimation) to a lower noise power value reduces its contribution to the resulting aggregated noise.

Step 9—Block 609 in FIG. 6—Aggregating the corresponding power adjustment cell resource in order to achieve a minimum aggregate noise (similar to Step 5—Block 505 in FIG. 5) and furthermore weighted aggregate adjustment per cell resource per RRU corresponding to per cell resource per branch traffic estimation enables a more advanced process in which the noise is adjusted not purely on noise level but also considering the signal level (up-link traffic) per branch. Corresponding the gain adjustment process to the signal and noise level, rather than only the noise enables the network to achieve better aggregated noise. Lower populated cell resource branches proportional gain reduction, enables the reduction of the contributed noise to the aggregate noise.

Step 10—Block 610 in FIG. 6—Measuring the aggregated cell resource power and noise level for validation (similar to Step 8—Block 508 in FIG. 5).

Goals 3, Noise level measurements per antenna (RRU) and per cell resource, and re allocation of sectors in order to achieve optimum signal to noise ratio per sector. The algorithm achieves optimum signal to noise ratio by cell resource reallocation, the redistribution of the cell resource enables optimum signal to noise ratio by reducing the number of aggregated antennas for a sector distributed in a high uplink traffic location.

This algorithm is depicted in FIG. 6 and and may consist of the following steps:

Step 1—Block 701 in FIG. 6—Receiving all the uplink mobile signals in a radio frequency band from an antenna (Similar to Step 1 Why is it step 5 all the time—Block 501 in FIG. 5).

Step 2—Block 702 in FIG. 6—Low noise amplification of all the signals in received in the radio frequency band (Similar to Step 2—Block 502 in FIG. 5).

Step 3—Block 703 in FIG. 7—Measuring the amplified receiver radio frequency band total composite power. (Similar to Step 3—Block 503 in FIG. 5).

Step 4—Block 704 in FIG. 7—Generating one or more digitized cell resources in the amplified receiver radio frequency band by digital filtering contiguous pieces of spectrum. (Similar to Step 4—Block 504 in FIG. 5).

Step 5—Block 705 in FIG. 7—Measurement the amplified cell resource power (desired and noise) and relative noise power element (similar to Step 5—Block 505 in FIG. 5).

Step 6—Block 706 in FIG. 6—Measuring the desired uplink signal power within the total (desired+noise and interference) signal in the cell resource digital filter (similar to Step 6—Block 606 in FIG. 6). The level of the measured desired signal in each cell resource is a proper estimation of the uplink traffic or capacity in that RRU.

Step 7—Block 707 in FIG. 6—Block 607 in FIG. 6—According to the desired signal power (traffic estimation) determining per antenna (or per RRU in case of multiple antenna per RRU) per cell resource the targeted noise power value (similar to Step 7—Block 607 in FIG. 6).

Step 8—Block 708 in FIG. 6—Re-allocation of cell resource to the desired RRU in order to achieve a predetermined Calculated "desired level of the traffic estimators".

For a given allocation and routing of cell resources, compare the traffic estimators of the various cell resources after the aggregating process. Calculate the "desired level of the traffic estimators" and perform now a traffic estimator equalization process (The "desired value of the traffic estimator" can be for example an average value or mean value or any other statistical value). By this traffic estimator equalization process we mean, re-allocating cell resources to one or more RRUs so that now the various cell resources traffic estimators are equalized and aiming to be as close as possible to the calculated "desired level of the traffic estimators".

The end result for example can be that a zone (Zone is an area covered by an RRU) covered by some cell resources increases while the zone covered by other cell resources decreases.

Another alternative for example is to reallocate new cell resources (For example, add small cells) to those zones in which there is high traffic estimators.

Step 9—Block 709 in FIG. 6—Aggregating reallocated cell resources based on the equalization process performed in the previous step.

Step 10—Block 710 in FIG. 6—Measuring the aggregated cell resource power and noise level for validation (similar to Step 8—Block 508 in FIG. 5).

We claim:

1. A digital distributed antenna system (DAS) for coupling to output ports of a plurality of base transceiver stations (BTS's) comprising:
   a plurality of remote radio units (RRUs) in communication with mobile devices;
   a central digital hub for routing and processing digitized RF signals, wherein the central digital hub is coupled to the RRUs and to the BTS's; and
   at least one uplink digital filter bank comprising a plurality of uplink digital filters, each of the uplink digital filters being matched to a unique uplink cell resource, a uplink cell resource comprising a band of contiguous frequencies within a frequency spectrum owned by an operator including at least one or more signals being received from one or more mobile devices in an uplink direction
   wherein the at least one uplink digital filter bank is located in two or more RRUs of the plurality of RRUs, and
   wherein, in the uplink direction, a noise aggregation process is performed on two or more RRUs for a plurality of uplink cell resources of the two or more RRUs and not across a whole frequency band of the two or more RRUs.

2. The DAS according to claim 1, wherein the noise aggregation process sets an individual weighted pre-aggregation gain to equalize a plurality of noise levels coming from the plurality of uplink cell resources of a plurality of RRUs prior to noise aggregation process being performed.

3. The DAS according to claim 2, wherein the individual weighted pre-aggregation gain is set according to a targeted noise level determined by a total number of a plurality of individual uplink cell resource data units that are aggregated into a combined uplink cell resource data sample.

4. The DAS according to claim 1, further comprising:
   a thermal noise measurement module for measuring thermal noise in a plurality of individual uplink cell resource data samples,
   wherein an individual weighted pre-aggregation gain is set per each cell resource in each RRU based upon the measured thermal noise in that cell resource.

5. The DAS according to claim 4, further comprising:
   an interference measurement module for measuring interference levels in one or more of the plurality of individual uplink cell resource data samples in one or more of the plurality of RRUs,
   wherein an individual weighted pre-aggregation gain is set per one or more cell resources belonging to one or more RRUs based upon the measured interference levels measured in the one or more of the individual uplink cell resources.

6. The DAS according to claim 1, further comprising:
an automatic noise level control module for traffic estimation of uplink traffic in one or more cell resources in one or more RRU;
wherein an individual weighted pre-aggregation gain per one or more cell resources is set differently based upon the uplink traffic estimation.

7. The DAS according to claim 6, wherein the automatic noise level control module allocates additional sectors to one or more RRUs in a certain portion of a building to decrease a number of cell resources being aggregated per each sector to improve a signal to noise ratio in each of the plurality of individual uplink cell resource data samples.

8. The DAS according to claim 6, wherein the automatic noise level control module allocates a full BTS sector cell resource to only a specific RRU to eliminate any noise aggregation and to improve a signal-to-noise ratio of the full BTS sector cell resource.

9. The DAS according to claim 6, further comprising:
an interference measurement module for measuring interference levels in one or more of the plurality of individual uplink cell resource data samples,
wherein the automatic noise level control module sets individual weighted pre-aggregation gain to those one or more individual cell resources to a level that eliminates an interference in order to prevent the interference from being aggregated.

10. The DAS according to claim 1, further comprising:
a noise aggregation process performed on one or more cell resources,
wherein an individual weighted pre-aggregation gain is set to a level so that it reduces a contribution of lower traffic or no traffic uplink digital filtered cell resources noise to a post aggregation noise.

11. The DAS according to claim 1, wherein the central digital hub is coupled to at least one other central digital hub.

12. A digital distributed antenna system (DAS) comprising:
a central digital hub coupled to a plurality of base transceiver stations (BTS's) and a plurality of remote radio units (RRUs), the central digital hub comprising:
at least one uplink digital filter bank comprising a plurality of uplink digital filters;
each of the plurality of uplink digital filters being matched to a unique cell resource, a cell resource comprising a band of contiguous frequencies within a frequency spectrum owned by an operator, and each cell resource including at least one or more signals being received from one or more mobile devices in an uplink direction,
wherein, in the uplink direction, a noise aggregation process is performed on two or more RRUs for a plurality of uplink cell resources of the two or more RRUs and not across a whole frequency band of the two or more RRUs.

13. A method for harmonizing noise aggregation for a digital distributed antenna system (DAS) coupled to a plurality of base transceiver stations (BTS's) and a plurality of remote radio units (RRUs), the method comprising:
receiving a plurality of individual uplink cell resource data samples from the plurality of RRUs;
allocating an individual weighted pre-aggregation gain to one or more individual uplink cell resource data samples;
aggregating the one or more of the individual uplink cell resource data samples into a combined uplink cell resource data sample; and
transmitting the combined uplink cell resource data sample to an assigned BTS,
wherein a cell resource comprises a band of contiguous frequencies within a frequency spectrum that an operator owns,
wherein, in an uplink direction, a noise aggregation process is performed on two or more RRUs for one or more uplink cell resource of the plurality of RRUs and not across a whole frequency band of the plurality of RRUs, and
wherein the noise aggregation process sets an individual weighted pre-aggregation gain to equalize noise levels coming from the plurality of RRUs prior to noise aggregation process being performed.

14. The method according to claim 13, wherein the individual weighted pre-aggregation gain is set according to a targeted noise level determined by a total number of a plurality of individual uplink cell resources units that are aggregated into a combined uplink cell resource data sample.

15. The method according to claim 13, further comprising:
measuring thermal noise in each of a plurality of individual uplink cell resource data samples,
wherein an individual weighted pre-aggregation gain is set per each cell resource in each RRU based upon the measured thermal noise in that cell resource.

16. The method according to claim 15, further comprising:
measuring interference levels in one or more of the plurality of individual uplink cell resource data samples in the plurality of RRUs,
wherein an individual weighted pre-aggregation gain is set per one or more cell resources belonging to one or more RRUs based upon the measured interference levels measured in the one or more of the individual uplink cell resources.

17. The method according to claim 13, further comprising:
estimating uplink traffic in each cell resource in one or more RRUs;
wherein an individual weighted pre-aggregation gain per one or more cell resources is set differently based upon the uplink traffic estimation.

18. The method according to claim 17, further comprising:
allocating additional sectors to a portion of a building to decrease a number of cell resources being aggregated per each sector to improve a signal to noise ratio in each of the plurality of individual uplink cell resource data samples.

19. The method according to claim 17, further comprising:
allocating a full BTS sector cell resource to only a specific RRU to eliminate any noise aggregation and to improve a signal-to-noise ratio of the full BTS sector cell resource.

20. The method according to claim 17, further comprising:
measuring interference levels in the plurality of individual uplink cell resource data samples; and
setting individual weighted pre-aggregation gain to a level that eliminates an interference in order to prevent the interference from being aggregated.

* * * * *